(12) United States Patent
Nakajima et al.

(10) Patent No.: US 8,910,174 B2
(45) Date of Patent: Dec. 9, 2014

(54) STORAGE SYSTEM

(71) Applicants: Jun Nakajima, Kawasaki (JP); Daisuke Shinohara, Yokohama (JP)

(72) Inventors: Jun Nakajima, Kawasaki (JP); Daisuke Shinohara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/023,509

(22) Filed: Sep. 11, 2013

(65) Prior Publication Data

US 2014/0013071 A1 Jan. 9, 2014

Related U.S. Application Data

(63) Continuation of application No. 12/120,721, filed on May 15, 2008, now Pat. No. 8,549,528.

(30) Foreign Application Priority Data

Mar. 13, 2008 (JP) ................................. 2008-064970

(51) Int. Cl.
| | |
|---|---|
| G06F 3/06 | (2006.01) |
| G06F 12/02 | (2006.01) |
| G06F 11/34 | (2006.01) |
| H04L 29/08 | (2006.01) |
| G06F 11/20 | (2006.01) |

(52) U.S. Cl.
CPC .......... *G06F 12/0223* (2013.01); *G06F 3/0653* (2013.01); *G06F 3/061* (2013.01); *G06F 3/0647* (2013.01); *G06F 11/3485* (2013.01); *G06F 11/2071* (2013.01); *G06F 11/3419* (2013.01); *G06F 3/067* (2013.01); *G06F 11/3409* (2013.01); *H04L 67/1097* (2013.01)
USPC ....................................................... 718/104

(58) Field of Classification Search
CPC ............ G06F 11/1464; G06F 11/3466; G06F 17/30289; G06F 3/0614; G06F 11/3942; G06F 3/0631; G06F 17/15; G06F 11/3409
See application file for complete search history.

(56) References Cited

U.S. PATENT DOCUMENTS

6,792,392 B1 * 9/2004 Knight .......................... 702/186
7,127,555 B2   10/2006 Takeda et al.
(Continued)

FOREIGN PATENT DOCUMENTS

| JP | 2005-62941 | 3/2005 |
|---|---|---|
| JP | 2005-197969 | 7/2005 |

(Continued)

OTHER PUBLICATIONS

Office Action issued in Japanese Patent Application No. 2008-064970 on Dec. 20, 2011.

*Primary Examiner* — Eric Coleman
(74) *Attorney, Agent, or Firm* — Antonelli, Terry, Stout & Kraus, LLP.

(57) ABSTRACT

Provided is a storage system including a host computer, a memory device, a plurality of resources for allocating a volume of the memory device to an access from the host computer, a memory for storing a correspondence relationship of the plurality of resources, an input module to be used by an administrator for selecting a prescribed resource among the plurality of resources, and a controller for extracting other resources related to the selected resource by using the correspondence relationship, detecting the performance status of the extracted other resources, identifying a related resource having a correlation with the performance of the selected resource among the other resources based on the detection result, and causing an output module to output the association of the selected resource and the related resource.

4 Claims, 29 Drawing Sheets

(56) References Cited

U.S. PATENT DOCUMENTS

| | | |
|---|---|---|
| 7,418,546 B2 | 8/2008 | Taguchi et al. |
| 7,469,315 B2 | 12/2008 | Watanabe et al. |
| 7,620,720 B1 | 11/2009 | Gasser |
| 7,647,450 B2 | 1/2010 | Nagae et al. |
| 7,725,776 B2 | 5/2010 | Mikami |
| 7,730,259 B2 * | 6/2010 | Taguchi et al. ............... 711/114 |
| 7,954,150 B2 | 5/2011 | Croft et al. |
| 8,024,613 B2 * | 9/2011 | Ochi et al. ................. 714/30 |
| 8,082,394 B2 | 12/2011 | Nagai et al. |
| 2005/0229032 A1 | 10/2005 | Kusama et al. |
| 2006/0136522 A1 | 6/2006 | Sakashita et al. |
| 2007/0118715 A1 | 5/2007 | Kusama et al. |
| 2007/0150690 A1 | 6/2007 | Chen et al. |
| 2007/0226328 A1 * | 9/2007 | Kusama et al. ............... 709/223 |
| 2008/0141261 A1 | 6/2008 | Machida |
| 2008/0228755 A1 | 9/2008 | Haga et al. |
| 2008/0307271 A1 | 12/2008 | Nakajima et al. |

FOREIGN PATENT DOCUMENTS

| | | |
|---|---|---|
| JP | 2006-106901 | 4/2006 |
| JP | 2007-66259 | 3/2007 |
| JP | 2007-164650 | 6/2007 |
| JP | 2007-249447 | 9/2007 |

* cited by examiner

FIG.6

| VIRTUAL POOL IDENTIFIER | LOGICAL VOLUME NUMBER | RAID GROUP NUMBER |
|---|---|---|
| Pool1 | lv1 | RG1 |
|  | lv2 | RG2 |
| Pool2 | lv3 | RG2 |
|  | lv4 | RG3 |
| — | lv5 | RG3 |

| STORAGE NAME | LOGICAL VOLUME NUMBER | I/O Response Time | I/O Per Second | I/O Transfer Rate |
|---|---|---|---|---|
| STORAGE A | lv1 | 20 | 15 | 10 |
| STORAGE A | lv2 | 0 | 0 | 0 |
| STORAGE A | lv3 | 0 | 0 | 0 |
| STORAGE A | lv4 | 45 | 40 | 20 |
| STORAGE A | lv5 | 10 | 10 | 20 |

12510 / 12511 / 12516 / 12517 / 12518 / 12519

| STORAGE NAME | RAID GROUP NUMBER | I/O Response Time | I/O Per Second | I/O Transfer Rate |
|---|---|---|---|---|
| STORAGE A | RG1 | 20 | 15 | 10 |
| STORAGE A | RG2 | 10 | 10 | 10 |
| STORAGE A | RG3 | 45 | 40 | 20 |

FIG.8

| HOST COMPUTER NAME | VOLUME NUMBER | STORAGE NAME | DATA INTERFACE NUMBER | VIRTUAL VOLUME NUMBER | VIRTUAL POOL IDENTIFIER | LOGICAL VOLUME NUMBER | RAID GROUP NUMBER |
|---|---|---|---|---|---|---|---|
| HOST COMPUTER A | Vol-A | STORAGE A | p1 | w1 | Pool1 | lv1 | RG1 |
| HOST COMPUTER A | Vol-B | STORAGE A | p2 | w2 | Pool2 | lv4 | RG3 |

FIG.14

| ACCESS PERIOD | STORAGE NAME | LOGICAL VOLUME NUMBER | DATA AREA | MAXIMUM I/O PER SECOND |
|---|---|---|---|---|
| 0:00~1:00 | STORAGE A | lv1 | 0M~41M | 50 |
| | | lv2 | 84M~125M | 60 |
| | STORAGE B | lv5 | 0M~41M | 80 |
| 1:00~2:00 | STORAGE A | lv3 | 42M~83M | 20 |
| | ... | ... | ... | ... |
| ... | ... | ... | ... | ... |

| HOST COMPUTER NAME | VOLUME NUMBER | STORAGE NAME | DATA INTERFACE NUMBER | LOGICAL VOLUME NUMBER | RAID GROUP |
|---|---|---|---|---|---|
| HOST COMPUTER A | Vol-A | STORAGE A | p1 | lv1 | RG1 |
| | | STORAGE B | p2 | lv2 | RG2 |

FIG.23

| STORAGE NAME | LOGICAL VOLUME NUMBER | MAIN/SUB | REPLICATION PAIR OPPONENT | |
|---|---|---|---|---|
| | | | STORAGE NAME OF REPLICATION OPPONENT | LOGICAL VOLUME NUMBER OF REPLICATION OPPONENT |
| STORAGE A | lv1 | Main | STORAGE B | lv2 |
| STORAGE B | lv2 | Sub | STORAGE A | lv1 |

FIG.24

| 12510 | | | | |
|---|---|---|---|---|
| 12511 | 12512 | 12513 | 12514 | 12515 |
| STORAGE NAME | LOGICAL VOLUME NUMBER | I/O Response Time | I/O Per Second | I/O Transfer Rate |
| STORAGE A | lv1 | 20 | 15 | 10 |
| STORAGE B | lv2 | 1 | 2 | 1 |

| 12510 | | | | |
|---|---|---|---|---|
| 12511 | 12516 | 12517 | 12518 | 12519 |
| STORAGE NAME | RAID GROUP NUMBER | I/O Response Time | I/O Per Second | I/O Transfer Rate |
| STORAGE A | RG1 | 20 | 15 | 10 |
| STORAGE B | RG2 | 10 | 10 | 10 |

FIG.25

| 12921 | 12922 | 12923 | 12924 | 12925 | 12926 | 12927 | 12928 | 12929 | 12930 |
|---|---|---|---|---|---|---|---|---|---|
| HOST COMPUTER NAME | VOLUME NUMBER | STORAGE NAME | DATA INTERFACE NUMBER | LOGICAL VOLUME NUMBER | RAID GROUP | STORAGE NAME OF REPLICATION OPPONENT | LOGICAL VOLUME NUMBER OF REPLICATION OPPONENT | MAIN/ SUB | PERFORMANCE CORRELATION FLAG |
| HOST COMPUTER A | Vol-A | STORAGE A | p1 | vv1 | RG1 | STORAGE B | vv2 | Main | 1 |
| | | STORAGE B | p2 | vv2 | RG2 | STORAGE A | vv1 | Sub | 0 |

12920

STORAGE SYSTEM

CROSS-REFERENCE TO RELATED APPLICATIONS

This application is a continuation of U.S. application Ser. No. 12/120,721, filed May 15, 2008 and which application relates to and claims priority from Japanese Patent Application No. 2008-064970, filed on Mar. 13, 2008, the entire disclosures of which are incorporated herein by reference.

BACKGROUND

The present invention generally relates to a storage system and its performance management method, and in particular relates to a storage system configured to manage the response performance of a storage subsystem to an I/O request from a host computer, and to its performance management method.

A system administrator needs to continuously manage a storage subsystem in order to maintain the response performance of that storage subsystem to a host computer. For instance, the administrator needs to continuously monitor the response performance from the storage subsystem to the host computer or the response performance from the host computer to the storage subsystem, promptly identify the cause if the response performance deteriorates, and take measures such as replacing the hard disk drive apparatus of the storage subsystem.

As a conventional example concerning this kind of management technology, U.S. Pat. No. 7,127,555 (Patent Document 1) discloses technology for narrowing down the resources to be output as management information by referring to a mapping table among the resources when information pertaining to the performance of the respective resources in a computer system is to be notified to the administrator.

SUMMARY

With Patent Document 1, upon managing the performance of a certain resource existing in the storage system, all resources associated with the resource to be monitored and the performance information thereof are output to the administrator based on the mapping information set between the host computer and the storage subsystem.

Among all of these resources, there are resources that will not affect the performance of the resource to be monitored since the processing based on the I/O access from the host computer is complete, and resources that do not receive I/O requests to begin with. Nevertheless, if all resources are presented to the administrator, the administrator will not be able to promptly and accurately identify the truly problematic resource having a correlation with the performance of the resource to be monitored, and which is the bottleneck causing the performance deterioration of the resource.

In order to overcome the foregoing problem, an object of the present invention is to provide a storage system capable of promptly and accurately identifying a problematic resource that is affecting the response performance of a storage subsystem to a host computer, and which is thus suitable for maintaining the responsiveness of the storage subsystem to the host computer system.

Thus, in order to achieve the foregoing object, the performance management of the storage system according to the present invention enables the administrator to promptly identify the problematic resource by limiting the number of resources to be presented to the administrator as a result of taking into account the status of the I/O request to the resources in addition to the mapping information to such resources upon identifying the resource affecting the response of the storage subsystem to the host computer.

As described above, according to the present invention, it is possible to provide a storage system capable of promptly and accurately identifying a problematic resource that is affecting the response performance of a storage subsystem to a host computer, and which is thus suitable for maintaining the responsiveness of the storage subsystem to the host computer system.

DESCRIPTION OF DRAWINGS

FIG. 6 is a diagram showing an example of a table showing the registration status of a logical volume in a pool to be stored in the configuration information repository retained by the performance monitoring computer according to the first embodiment;

FIG. 7 is a diagram showing an example of a table showing the performance information of a computer system to be stored in the performance information repository retained by the performance monitoring computer according to the first embodiment;

FIG. 8 is a diagram showing an example of a table showing the configuration information including the performance association identified with the performance information to be stored in the configuration information repository retained by the performance monitoring computer according to the first embodiment;

FIG. 14 is a diagram showing an example of an access tendency table to be stored in the access tendency repository retained by the performance monitoring computer according to the first embodiment;

FIG. 22 is a diagram showing an example of an alternate path corresponding host computer-storage mapping table to be stored in the configuration information repository retained by the performance monitoring computer according to the second embodiment;

FIG. 23 is a diagram showing an example of a replication pair definition table to be stored in the configuration information repository retained by the performance monitoring computer according to the second embodiment;

FIG. 24 is a diagram showing an example of a performance information table depicting the SAN performance information to be stored in the performance information repository retained by the performance monitoring computer according to the second embodiment;

FIG. 25 is a diagram showing an example of a configuration information table depicting the replication pair definition and the SAN configuration information including the performance association to be stored in the configuration information repository retained by the performance monitoring computer according to the second embodiment;

DETAILED DESCRIPTION

A storage system and a performance management method of such storage system pertaining to a representative embodiment of the present invention are now explained with reference to the attached drawings. Incidentally, the embodiments explained below are not intended to limit the present invention in any way.

Figure 1:
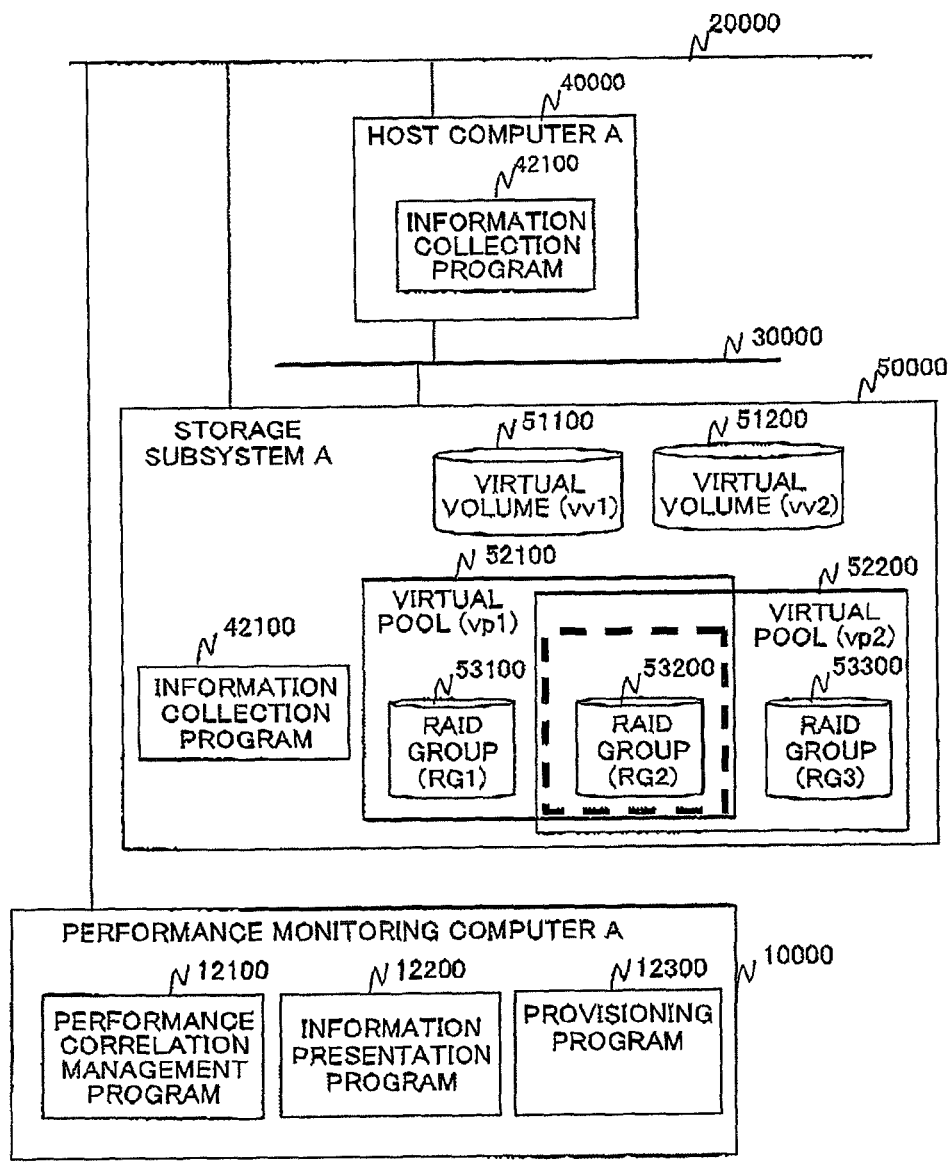
FIG. 1 is a diagram showing a configuration example of a computer system according to the first embodiment.

FIG. 1 is a block diagram showing the first embodiment of the storage system pertaining to the present invention. The storage system includes one or more servers (host computers) having an information collection program, one or more storage apparatuses (storage subsystems) having an information collection program and retaining a virtualization function, and one or more performance monitoring computers having a performance correlation management program and a provisioning module. Contents of the respective programs will be described later.

Although this embodiment explains a case where the information collection program of the host computer and the storage subsystem is retained in the host computer and the storage subsystem, the information collection program may also be executed in a dedicated host computer or the performance monitoring computer.

For the sake of convenience in the ensuing explanation, in the storage system, let it be assumed that one host computer (host computer A) 40000 and one storage subsystem (storage subsystem A) 50000 retaining a virtualization function are mutually connected via a fibre channel network 30000.

The storage subsystem A (50000) provides a virtual pool vp1 (52100) and a physical storage area corresponding to RAID groups RG1 (53100) and RG2 (53200) to the host computer A (40000) via a virtual volume vv1 (51100).

Similarly, [the storage subsystem A (50000)] provides a virtual pool vp2 (52200) and a physical storage area corresponding to RAID groups RG2 (53200) and RG3 (53300) to the host computer A via a virtual volume vv2 (51200). The physical storage area is provided by a hard disk drive or a semiconductor memory such as a flash memory.

Based on the virtualization function, the user of the host computer A is able to define a volume of an arbitrary capacity as a virtual volume, and perform host access to a storage area in the virtual pool via the virtual volume. Here, let it be assumed that the RAID group RG2 is being shared by the virtual pools vp1, vp2.

The I/O request from the host computer A to a logical address of the virtual volume is processed according to the mapping information retained in the shared memory by the storage subsystem. If the logical address subject to the I/O request does not exist in the mapping information, the storage subsystem dynamically allocates a storage area (volume) from the RAID group, which corresponds to the virtual pool, to the virtual pool. A page described later (allocation unit of a storage area) may also be allocated to the virtual pool.

In other words, for the management host computer 10000, the virtual volumes to perform the I/O request and the volumes set in the virtual pools in which the I/O processing is actually performed are of a many-to-many relationship, and there are numerous statuses where the host I/O is not performed to a logical volume associated with the virtual volume via a pool such as when the layout is designed in consideration of the performance such as during sequential access, when the layout is designed in consideration of power saving, or when newly adding a physical area on demand. When taking the case of FIG. 1 as an example, this would be a case where the host I/O to the vv1 will be made to a physical area configured from the RG1, but not made to a physical area configured from the RG2.

As the topology of the host computer A and the storage subsystem A, instead of directly connecting these components with the fibre channel 30000 as shown in FIG. 1, they may also be connected via networking equipment such as one or more fibre channel switches. Moreover, although the fibre channel 30000 is used to connect the host computer A and the storage subsystem A, this may be a different network so as long as it is a data communication network; for instance, it may also be an IP network.

The performance monitoring computer A (10000) for monitoring the performance of the resources in the storage subsystem A is connected to the host computer A and the storage subsystem A via the management network 20000, and communicates with the information collection program of the respective subsystems. The performance correlation management program 12100 determines the performance association among a plurality of resources according to the determination processing described later.

The information presentation program 12200 presents the performance association determined by the performance correlation management program according to the presentation processing described later. The provisioning program 12300 migrates the data stored in the storage area according to the migration processing described later.

Figure 2:
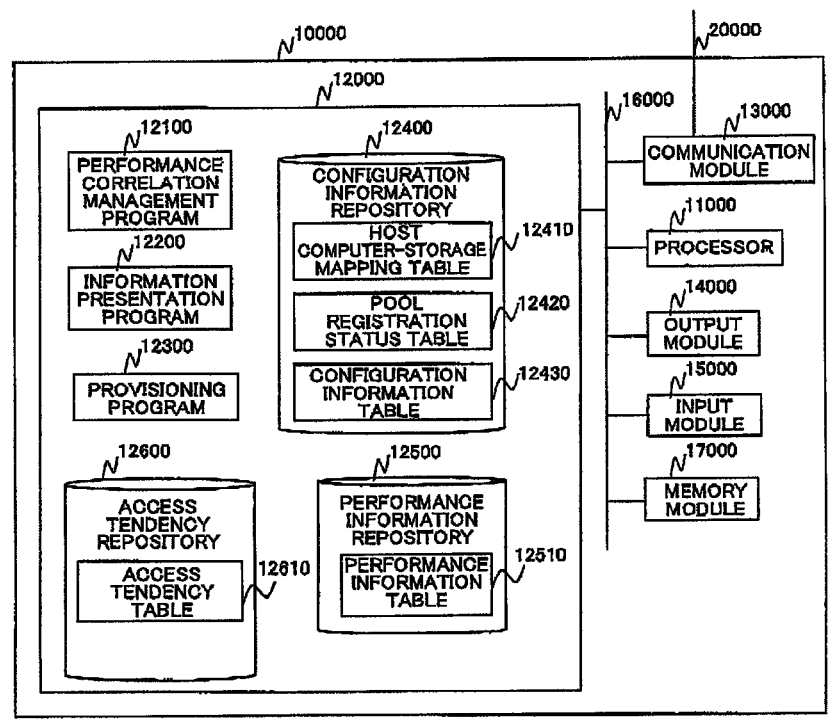
FIG. 2 is a diagram showing a configuration example of a performance monitoring computer according to the first embodiment.

FIG. 2 shows a hardware block diagram pertaining to a configuration example of the performance monitoring computer 10000. The performance monitoring computer includes a processor 11000, a memory 12000, a communication module 13000 for connecting to the management network 20000, an output module 14000 such as a display apparatus for outputting the execution result of the processing performed by the performance correlation management program 12100, an input module 15000 such as a keyboard for the administrator to input commands, and a memory module 17000, and these components are mutually connected via a communication path 16000 such as an internal bus.

The memory 12000 stores a performance correlation management program 12100, an information presentation program 12200, and a provisioning program 12300, which are programs to be executed by the processor 11000, and a configuration information repository 12400, a performance information repository 12500, and an access tendency repository [12600], which are areas for storing the information collected from the information collection program of the respective subsystems belonging to the storage system.

The configuration information repository 12400 stores a host computer-storage mapping table 12410 retaining the correspondence relationship of the virtual volumes 51100, 51200 mounted on the host computer 40000, a pool registration status table 12420 showing the registration status in the virtual pool of the storage areas configuring the RAID group, and a configuration information table 12430 retaining the configuration information to be displayed upon taking into account the information of the performance information table described later.

The performance information repository 12500 stores a performance information table 12510 retaining the performance information of the subsystems belonging to the storage system and the resources of such subsystems. The processor 10000 reads and executes the programs stored in the memory 12000, and thereby performs processing for referring to and updating the tables stored in the memory 12000.

A resource is hardware or a single piece of logical component for allocating a storage resource of the memory device to the logical volumes (51100, 51200) to be accessed by the host computer A, and, as examples of the latter, the virtual pool, the logical volume of the virtual pool, and the RAID group associated with the logical volume of the virtual pool shown in FIG. 1, and a page described later exist as resources. As examples of the former, a data interface controller such as a storage port, a disk cache, and a processor exist as resources.

Although the provisioning program 12300 is stored in the memory 12000 of the management host computer 10000, this is not necessary a requisite configuration, and the provisioning program 12300 may also be executed in the memory 42000 of the host computer 40000 or the memory 52000 of the storage subsystem 50000, or executed in a separate host computer.

In addition, although the other programs and tables described above were all explained to be stored in the memory 12000, they may also be stored in the memory module 17000 or in a separate recording medium, and the processor 11000 may read these into the memory 12000 upon executing the programs or referring to the tables and thereby perform processing to such programs and tables. These programs and tables may also be retained in a separate host computer or a storage subsystem.

Figure 3:
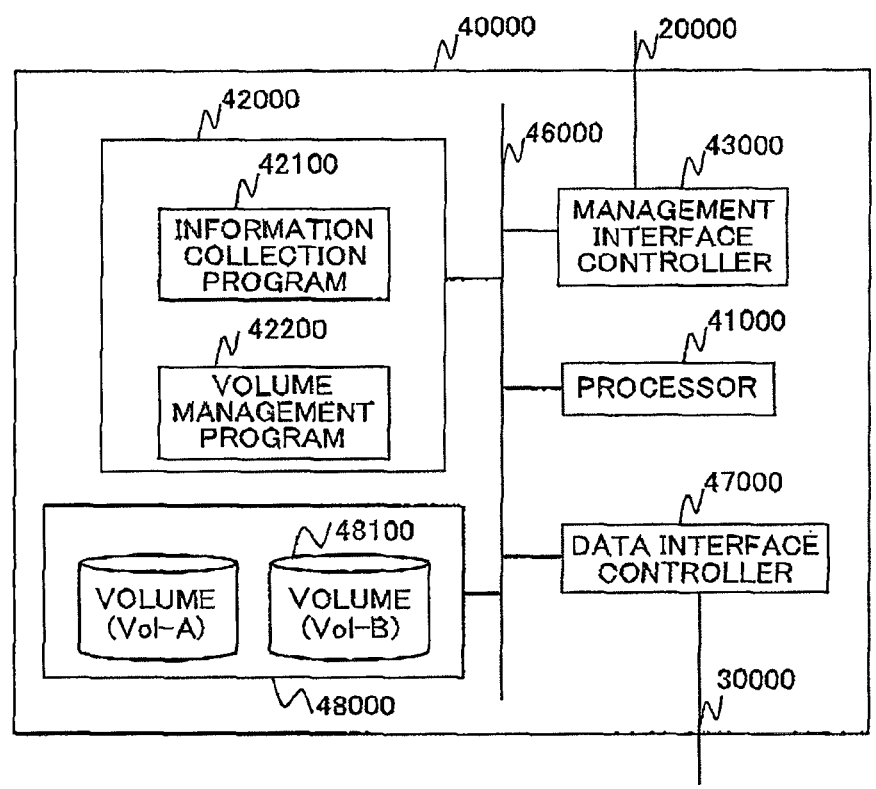
FIG. 3 is a diagram showing a configuration example of a host computer according to the first embodiment.

FIG. 3 shows a configuration example of the host computer 40000. The host computer 40000 includes a processor 41000, a memory 42000, a management interface controller 43000 for connecting to the management network 20000, one or more data interface controllers 47000 for connecting to the fibre channel 30000, and a memory module 48000, and these components are mutually connected via a communication path 46000 such as an internal bus.

The memory 42000 stores an information collection program 42100 for communicating with the performance monitoring computer 10000 and sending and receiving management information and performance information of the business host computer 40000, and a volume management program 42200 for mounting the volumes 51100, 51200 made open (available) from the storage subsystem 50000 on the host computer 40000. The information collection program 42100 of the host computer 40000 receives management information such as a polling message for collecting the performance information of the host computer 40000 from the monitoring host computer 10000.

The volume management program 42200 mounts the virtual volume provided to the host computer 40000 from the storage subsystem A on the volume 48100 in the memory module 48000 of the host computer A, and enables the business program in the host computer A to use the virtual volume of the storage subsystem A.

Although a case was explained where there is one host computer 40000, and the data interface controller of the host computer A is one unit, a plurality of host computers and a plurality of data interface controllers may be provided.

In addition, although a case was explained where the information collection program 42100 and the volume management program 42200 are stored in the memory 42000 of the host computer 40000, these programs may also be stored in another memory module or another storage medium and read by the processor 41000 into the memory 42000, or retained in another host computer or a storage subsystem.

Figure 4:
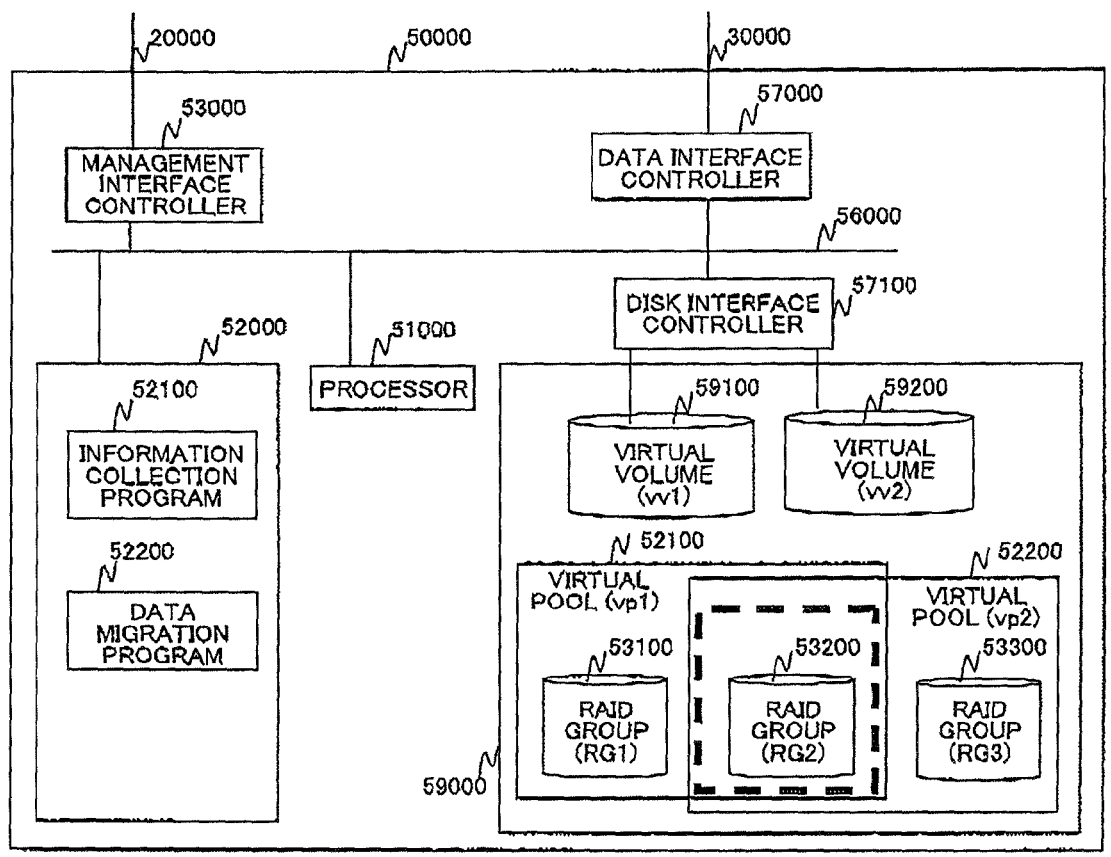
FIG. 4 is a diagram showing a configuration example of a storage subsystem according to the first embodiment.

FIG. 4 shows a function block diagram pertaining to a configuration example of the storage subsystem 50000. The storage subsystem 50000 includes a processor 51000, a memory 52000, a management interface controller 53000 for connecting to the management network 20000, a data interface controller 57000 for connecting to the fibre channel 30000, a disk interface controller 57100, and a volume provision unit 59000 for providing a data storage area, and these components are mutually connected via a communication path 56000 such as an internal bus.

The memory 52000 stores an information collection program 52100 for communicating with the performance monitoring computer and sending and receiving management information and performance information of the storage subsystem, and a data migration program 52200 for migrating data of a certain storage area to another storage area.

The volume provision unit 59000 enables the host computer 40000 to write data into a physical storage area by accessing the virtual volume of the storage subsystem 50000 as a result of allocating a logical volume, which is a partial area of the RAID group configured from a plurality of physical disks, to a virtual pool and mapping the virtual pool to the virtual volume.

Although a case was explained where there is one storage subsystem, the disk interface controller of the storage subsystem is one unit, and the disk interface controller of the storage subsystem is one unit, a plurality of storage subsystems, a plurality of data interface controllers, and a plurality of disk interface controllers may be provided.

In addition, although a case was explained where the information collection program 52100 is stored in the memory 52000, this program may also be stored in another memory module or another storage medium and read by the processor 51000 into the memory 52000 upon executing the program, or retained in another host computer or a storage subsystem.

Figure 5:
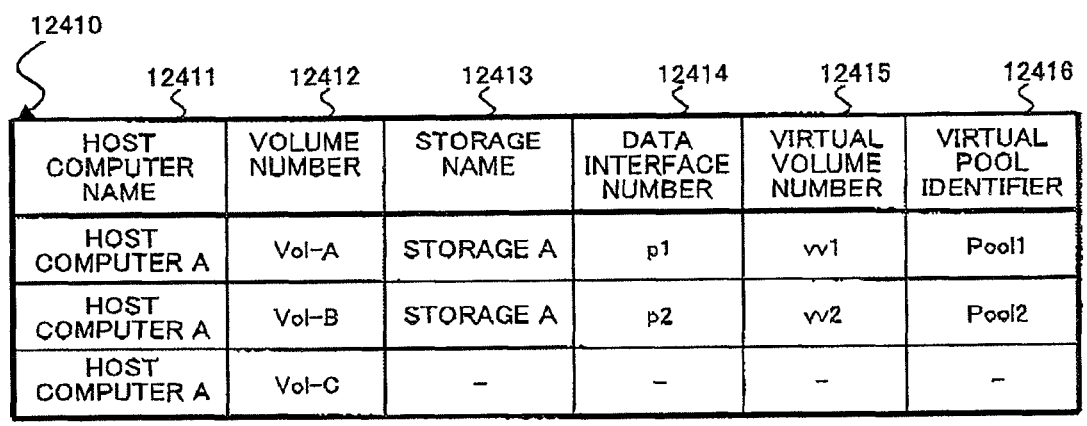
FIG. 5 is a diagram showing an example of a table showing the configuration information of the computer system to be stored in the configuration information repository retained by the performance monitoring computer according to the first embodiment.

FIG. 5 shows an example of the host computer-storage mapping table 12410 stored in the configuration information repository 12400 retained by the performance monitoring computer 10000. This table is used for managing with which virtual volume or virtual pool the respective volumes of the business host computer 40000 are associated via which data interface of the storage subsystem.

The host computer-storage mapping table 12410 is a table to which records are added by the performance correlation management program 12100. In the host computer-storage mapping table 12410, a value for uniquely identifying the business host computer is registered in the host computer name column 12411, a value for uniquely identifying a volume in the host computer is registered in the volume number column 12412, a value for uniquely identifying the storage subsystem that is corresponding to the volume of the host computer shown in the volume number column is registered in the storage name column 12413, a value for uniquely identifying the data interface being used by the volume of the volume number column is registered in the data interface number column 12414, a value for uniquely identifying the virtual volume that is being used by the respective volumes of the business host computer is registered in the virtual volume number column 12415, and a value for uniquely identifying the virtual pool to provide a storage area to the respective virtual volumes is registered in the virtual pool identifier column 12416.

Entries in which "-" is registered in the storage name column, the data interface number column, the virtual volume number column, and the virtual pool identifier column show that a storage is not allocated to the host computer.

FIG. 6 shows an example of the pool registration status table 12420 to be stored in the configuration information repository 12400 retained by the performance monitoring computer 10000. This table is used for managing to which logical volume or RAID group the virtual pool corresponds.

The pool registration status table 12420 is a table to which records are added by the performance correlation management program 12100. In the pool registration status table 12420, similar to the host computer-storage mapping table explained with reference to FIG. 5, a value for uniquely identifying the virtual pool to provide a storage area to the respective volumes is registered in the virtual pool identifier column 12421, a value for uniquely identifying the logical volume configuring the respective pools of the virtual pool identifier column is registered in the logical volume number column 12422, and a value for uniquely identifying the RAID group configuring the respective pools of the virtual pool identifier column is registered in the RAID group number column 12423.

FIG. 7 shows an example of the performance information table 12510 depicting the information concerning the performance of the resources in the storage to be stored in the performance information repository 12500 retained by the performance monitoring computer 10000. This table stores the performance information concerning resources such as the respective volumes of the respective host computers 40000, the logical volumes of the respective storage subsystems, the RAID groups of the respective storage subsystems, and so on.

The performance information table 12510 is a table to which records are added by the performance correlation management program 12100. In the performance information table [12510], a value for uniquely identifying the storage is registered in the storage name column 12511, a value for uniquely identifying the logical volume allocated to the virtual pool is registered in the logical volume number column 12512, the response time to the I/O from the processor 51000 to the logical volume is registered in the I/O Response Time column 12513, the I/O amount per unit time to the logical volume is registered in the IOPS (I/O per second) column 12514, and the I/O transfer amount per unit time from the logical volume to the cache memory or the like is registered in the I/O Transfer column 12515.

In addition, a value for uniquely identifying the RAID group is registered in the RAID group number column 12516, the response time to the I/O request from the processor or the like to the RAID group is registered in the I/O Response Time column 12517, the I/O amount per unit time to the RAID group is registered in the IOPS column 12518, and the I/O transfer amount per unit time from the RAID group is registered in the I/O Transfer column 12519.

In FIG. 7, although the resource I/O Response Time, the I/O Per Second, and the I/O Transfer Rate were listed as examples of the performance information for evaluating the performance, a performance index for each Read access and Write access such as a Read I/O Response Time or a Write I/O Response Time, or other performance indexes may also be used.

FIG. 8 shows an example of the configuration information table 12430 to be stored in the configuration information repository 12400 retained by the performance monitoring computer 10000. This table shows information pertaining to the correspondence relationship of the respective configurations (resources) under the SAN environment having performance association and identified by the I/O performance information stored in the performance information table 12510 shown in FIG. 7.

The configuration information table 12430 is a table to be created by the performance correlation management program 12100 based on information stored in the host computer-storage mapping table, the pool registration status table, and the performance information table. Column 12431 to column 12436 of the configuration information table are configured the same as the host computer-storage mapping table of FIG. 5, and column 12437 and column 12438 are configured the same as the pool registration status table of FIG. 6.

The table creation processing to be implemented by the performance correlation management program 12100 in the performance monitoring computer 10000 is now explained. This processing is periodically executed by the processor 11000 of the performance monitoring computer 10000 executing the program stored in the memory 12000.

The performance correlation management program creates a management table in order to identify whether there is a substantial performance correlation between the respective resources of the storage subsystem in accordance with the information of the performance of resources; that is, the I/O performance of the resources under the SAN environment.

Figure 9:
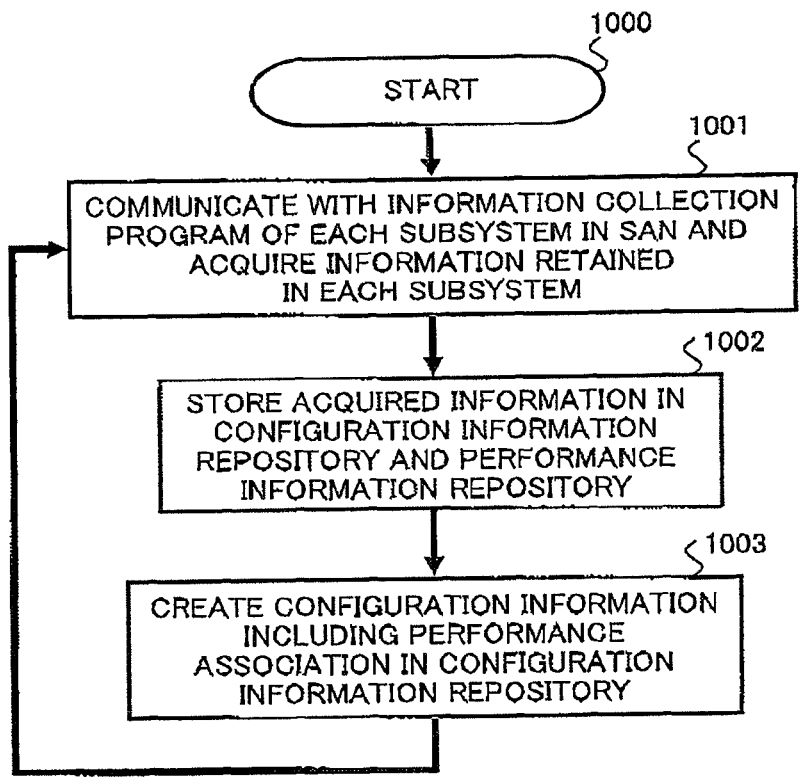
FIG. 9 is a flowchart showing an example of the association table creation processing of the performance correlation management program according to the first embodiment.

Unless otherwise specified herein, the respective steps are executed by the processor 11000 of the performance monitoring computer [10000]. FIG. 9 shows a flowchart 1000 depicting the outline of the association table creation processing to be executed by the processor 11000 that read the performance correlation management program 12100.

The processor 11000 communicates with the information collection program of the respective subsystems, and acquires the information retained in the respective subsystems (step 1001). Subsequently, the processor 11000 stores the collected information in the host computer-storage mapping table and the pool registration status table of the configuration information repository, and the performance information table of the performance information repository (step 1002).

The processor 11000 thereafter uses the information stored at step 1002 and creates a configuration information table configured from configuration information, which includes the performance related information described above, in the configuration information repository (1003).

The timing of the performance correlation management program 12100 acquiring configuration information from the information collection program of the respective subsystems and storing the configuration information in the host computer-storage mapping table of the configuration information repository, and the timing of the performance correlation management program acquiring performance information regarding the respective configurations from the information collection program of the respective subsystems and storing such performance information in the performance information table of the performance information repository may be the same timing or a different timing.

The timing of merging the performance association regarding the respective configurations with the information regarding the respective configurations may be the same as the timing of acquiring the configuration information and the performance information, or such merging can be performed at the timing that the information collection program of the storage subsystem 50000 monitors the change in the performance value of the configuration (resource) and notifies the change in performance value to the performance correlation identification program, and thereby perform step 1003.

At step 1001 for acquiring the information retained in the respective subsystems, the processor 11000 collects such information, which was collected by the information collection program operating in the respective subsystems, from the respective subsystems. The information collection program may collect the correspondence relationship concerning the host computer (40000) name, the volume number in the host computer, the name of the destination storage subsystem (50000), the destination data interface number, the logical volume number of the destination storage subsystem, and the RAID group of the destination storage subsystem by using a SCSI Inquiry command, or by other methods. The host computer 40000 may also acquire configuration information from the storage by the host computer 40000 issuing a SCSI Inquiry command to the storage subsystem 50000.

The information collection program of the host computer 40000 may acquire the performance information concerning the host computer by making a request to the OS, or by other methods. The information collection program of the storage may acquire the performance information concerning the storage by acquiring such performance information from a memory accumulated with performance information, or by other methods.

Subsequently, at step 1002 for creating the host computer-storage mapping table 12410 and the pool registration status table 12420 of the configuration information repository and the performance information table 12510 of the performance information repository, the processor 11000 creates a new entry in the respective tables, and registers the information collected at step 1001 in the respective columns of the newly created entry.

Figure 10:
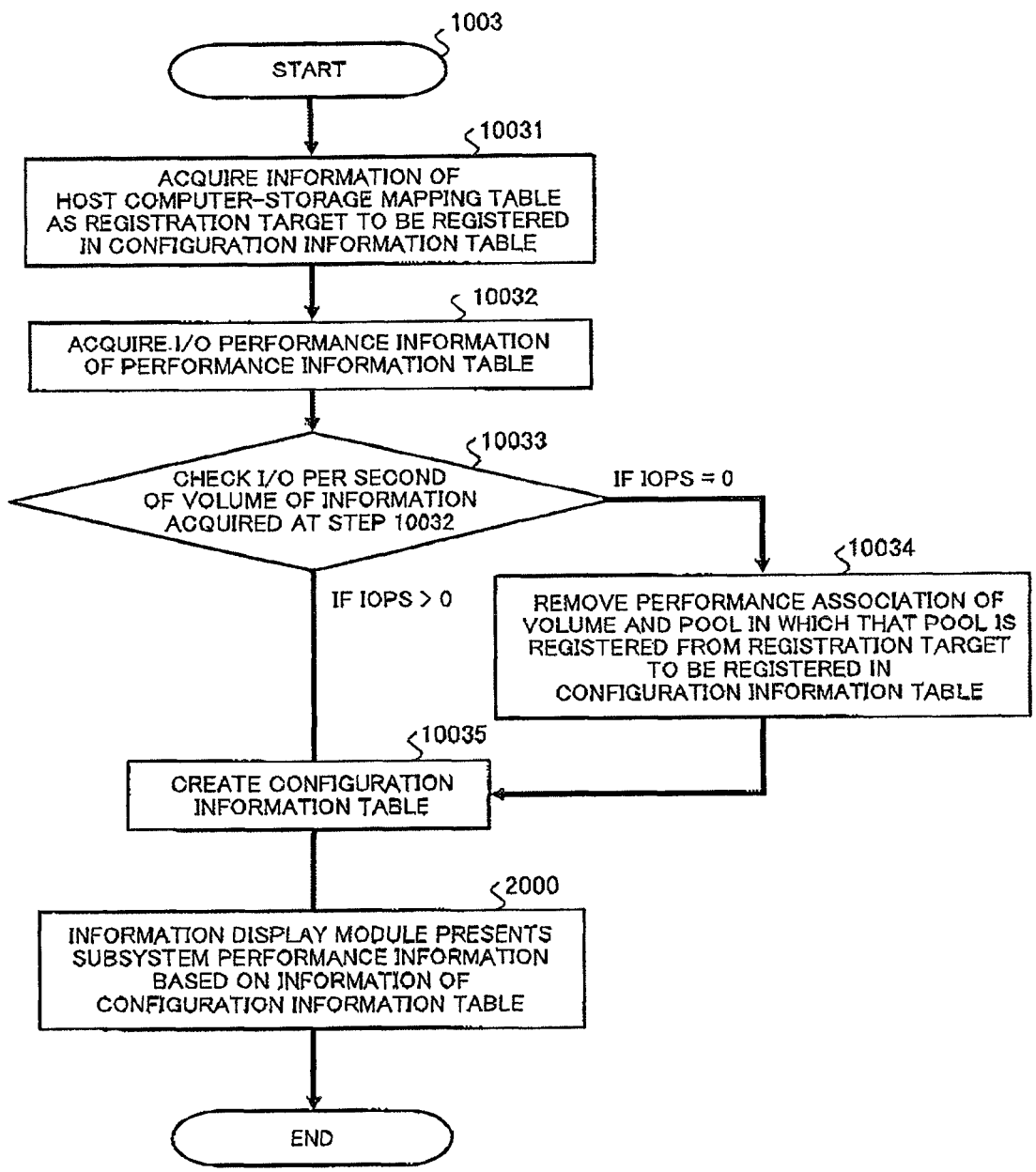
FIG. 10 is a flowchart showing an example of the performance correlation management processing and the performance correlation presentation processing of the performance correlation identification program according to the first embodiment.

Step 1003 for creating the configuration information including the performance association among a plurality of resources in the configuration information repository is shown with a detailed flowchart in FIG. 10. The processor 11000 refers to the information of the host computer-storage mapping table 12410 and the information of the pool registration status table 12420, and acquires the respective entries as the registration target to be registered in the configuration information table (step 10031).

In order to determine whether a performance association exists in the resources, the processor 11000 refers to the respective logical volumes in the performance information table (12512 of FIG. 7), and the I/O performance information (IOPS in this case) of the respective RAID groups (12516 of FIG. 7) (step 10032).

[The processor 11000] determines whether the IOPS value of the respective resources acquired at step 10031 is 0 (step 10033), and, if the IOPS is 0, removes the resource and the virtual pool corresponding to that resource from the registration target to be registered in the configuration information since the performance association thereof does not exist (step 10034).

Here, although a case of periodically creating the configuration information table was explained, the processor 11000 may also create the configuration information containing the performance association of resources (for instance, logical volumes), in which the presentation of the operational status was requested, in the configuration information repository at the timing of receiving an operational status presentation request from the host system management software based on the input module 15000 of the terminal used by the SAN administrator.

Here, although whether the IOPS is 0 was determined based on whether the resource is a registration target to be registered in the configuration information table, an arbitrary value of IOPS such as 10 or 20 other than 0 may also be set as the threshold value, and a performance index other than IOPS such as the I/O Response Time or the I/O Transfer Rate may also be used. In other words, if the resource has an IOPS that is below the threshold value, this resource is excluded from the analysis target upon creating the configuration information table since it will not affect the performance of the storage subsystem 50000; that is, it is unrelated to the deterioration in the response performance of the storage subsystem.

Meanwhile, if the resource has an IOPS that is greater than the threshold value, this resource is added to the performance analysis target upon creating the configuration information table since it will affect the deterioration in the response performance of the storage subsystem; that is, this resource may be the cause of the bottleneck (step 10035).

When the information display module receives the foregoing operational status presentation request from the host system management software via the input from the input module 15000 of the terminal used by the administrator, it presents the various information based on the information of the configuration information table created at steps 1003 to 10035 (step 2000).

Figure 11:
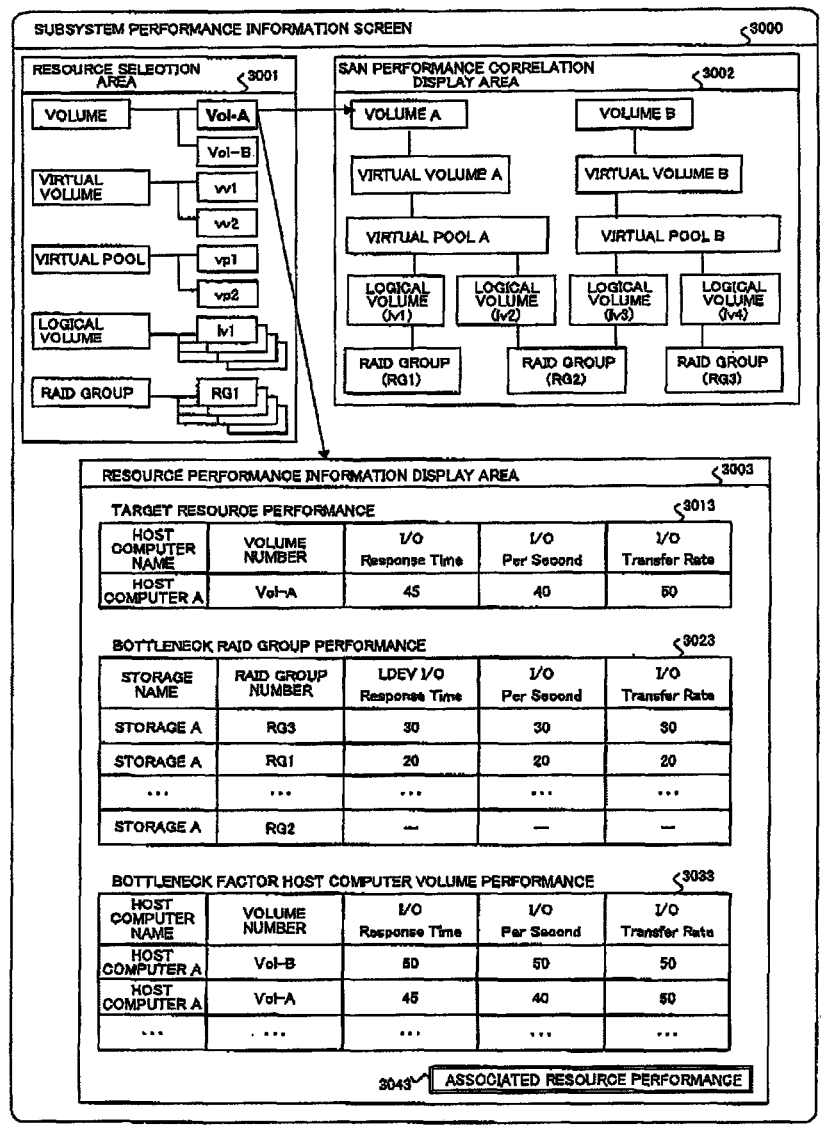
FIG. 11 is a diagram showing an example of a subsystem performance information screen to be presented to the administrator in the first embodiment.

FIG. 11 shows an example of the subsystem performance information screen 3000 to be output by the processor 11000 at step 2000. The screen 3000 shown in FIG. 11 includes a resource selection area 3001 for the administrator to select the resources to be analyzed when the deterioration in the response of the storage subsystem to the host computer is notified and the administrator is to pursue the cause of such deterioration, a SAN performance correlation display area 3002 for displaying the correlation of a plurality of resources based on the mapping or correspondence relationship of such plurality of resources under the SAN environment, and a resource performance information display area 3003 for displaying information pertaining to the performance of resources. A correlation is defined based on the consolidating information, the related information, the corresponding information, or the configuration information among a plurality of resources.

The resource selection area 3001 shows resources such as the volume, the virtual volume, the virtual pool, the logical volume and the RAID group by category retained in the respective subsystems existing under the SAN environment. Although the performance information screen 3000 displays the volume, the virtual volume, the virtual pool, the logical volume, and the RAID group, a data interface controller such as a storage port, a disk cache, or a processor may also be displayed as resources, and there is no particular limitation on the type of resources that can be displayed.

The resource selection area 3001 depicted in FIG. 11 shows a state where the volume Vol-A is being selected by the input module 15000. In FIG. 11, let it be assumed that the value of the I/O Per Second to the logical volume Iv2 is greater than 0; that is, the logical volume Iv2 is being used by the virtual pool A.

The SAN performance correlation display area 3002 is an area for displaying information concerning the resources selected in the resource selection area 3001 based on the performance correlation identified with the performance correlation information that was created as a result of the processor 11000 executing the performance correlation management program 12000.

This is explained in detail below. The SAN performance correlation display area 3002 is shown in a tree shape by linking the resources; namely, the virtual volume A in the storage subsystem as the mount destination of the volume A, the virtual pool A to be used for securing a physical storage area to become the storage destination of data in the virtual volume A, the logical volumes Iv1 and Iv2 allocated to the virtual pool A, and the RAID groups RG1 and RG2 as the respective storage areas of the logical volumes Iv1 and Iv2 with a solid line to show their correlation.

Similarly, the virtual volume B in the storage subsystem as the mount destination of the volume B existing in the same host computer as the volume A, the virtual pool B to be used by the virtual volume B for securing the actual physical [storage] area, the logical volumes Iv3 and Iv4 allocated to the virtual pool B, and the RAID groups RG2 and RG3 as the respective storage areas of the logical volumes Iv3 and Iv4 are linked with a solid line.

The plurality of resources that relate to, corresponding to, or are dependent on the volume A and volume B displayed by being connected with a solid line in the SAN performance correlation display area 3002 show that they could be in a relation of being mutually dependent in terms of performance via the RG2.

The resource performance information display area 3003 is configured from a target resource performance table 3013 showing the information pertaining to the performance of the target resource selected in the resource selection area 3001, a bottleneck RAID group performance table 3023 showing a list of RAID groups that have a performance association with the target resource and could become a bottleneck in connection with the deterioration in performance of the target resource, and a bottleneck factor host computer volume performance table 3033 showing a list of the host computer volumes that have a performance association with the target resource and which could become a bottleneck factor.

Here, the bottleneck RAID group performance table 3023 and the bottleneck factor host computer volume performance table 3033 list the resources in order from those having the most inferior performance to facilitate the administrator's pursuit of the factor that is deteriorating the performance of the resource under the SAN environment.

When listing the resources in the resource performance information display area 3003, the performance information of the respective resources showing correlation in the SAN performance correlation display area 3002 may also be displayed. The order of listing the resources may also be decided by using the performance information of the respective resources showing correlation in the SAN performance correlation display area 3002.

Each table of the resource performance information display area 3003 displays, among the performance information acquired at step 1002, the performance information extracted from the performance table 12510 showing the performance information of SAN in the performance information repository with the selected resource and the resource related to the related resource as the key.

The related resource performance button 3043 in the resource performance information display area 3003 is an icon for commanding the output of performance information determined at step 1003. When the input module 15000 selects the icon, the processor 11000 displays the resource selected in the resource selection area 3001 and the performance information of a resource having performance correlation with the selected resource on the output module 14000.

The output performance correlation is notified to the SAN administrator and the host system management software, and used for pursuing the SAN performance deterioration factor.

Figure 12:
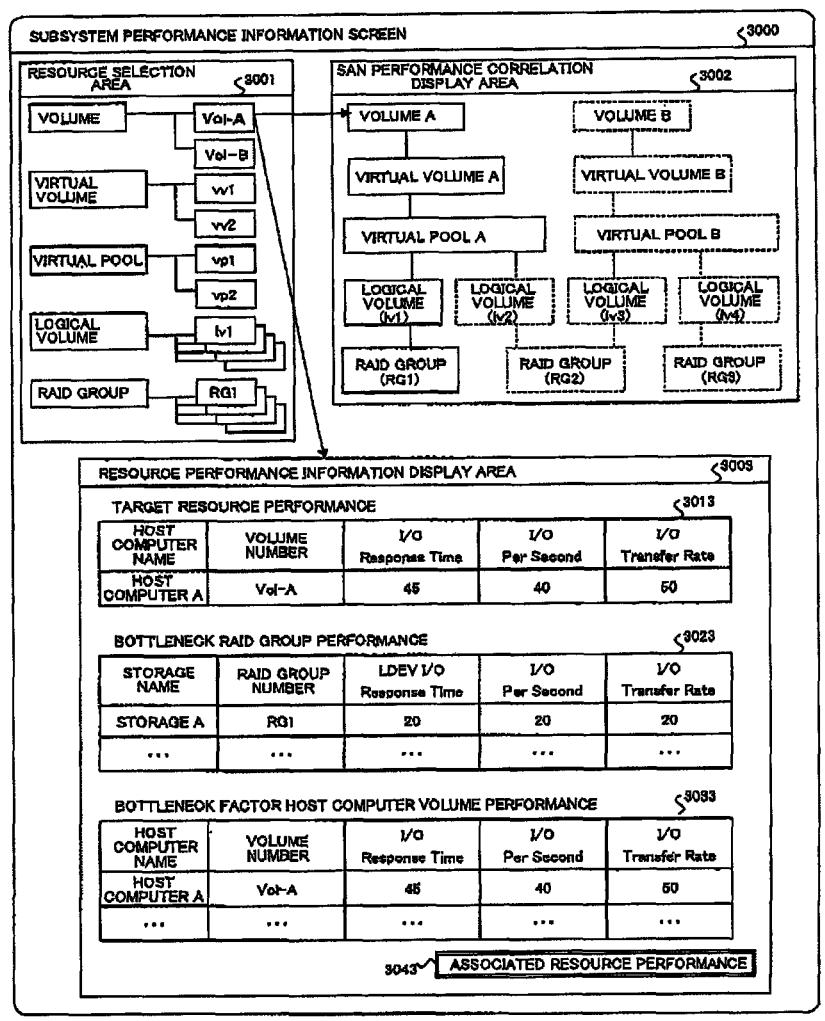
FIG. 12 is a diagram showing an example of a subsystem performance information screen to be presented to the administrator in the first embodiment.

FIG. 12 shows an example of the subsystem performance information screen 3000 to be output by the processor 11000 at step 2000. The subsystem performance information screen 3000 of FIG. 12 has the same display area configuration as FIG. 11, and includes a resource selection area 3001, a SAN performance correlation display area 3002, and a resource performance information display area 3003.

The resource selection area 3001 of FIG. 12 shows that the administrator is selecting Vol-A, which is one volume of the host computer existing in the SAN environment. In FIG. 12, unlike the case of FIG. 11, let it be assumed that the value of the I/O Per Second to the logical volume Iv2 is "0"; that is, the logical volume Iv2 is not being used by the virtual pool A.

The SAN performance correlation display area 3002 displays, using the same method as FIG. 11, the resources having performance correlation with the volume Vol-A selected in the resource selection area 3001. Since the volume A, the virtual volume A, the virtual pool A, the logical volume Iv1, and the RAID group RG1 have performance correlation, they are encircled with a solid line and also connected with a solid line.

Meanwhile, the logical volume Iv2, and the RAID group RG2, the logical volumes Iv3, Iv4, the virtual pool B, the virtual volume B, and the volume B related to the logical volume Iv2 mutually have correlation as shown with the solid line in FIG. 11. Nevertheless, since the value of the I/O Per Second to the logical volume Iv2 is "0," the failure factor that occurred in the volume A is substantially unrelated; that is, since the volume A has no performance correlation, these resources are encircled with a dashed line and also connected with a dashed line for differentiation from the resources mutually having performance correlation shown with the solid line.

At step 1003, by creating the configuration information containing the performance association in the configuration information repository, the SAN performance correlation display including the dashed line of FIG. 12 is configured. In order to show that there is no performance correlation, resources having no correlation with the target resource can be excluded from the SAN performance correlation display area 3002.

In addition, resources with correlation and resources without correlation may be indicated in different colors. In essence, the screen display shown in FIG. 11 and FIG. 12 is merely an example, and other display modes may also be adopted. Moreover, the I/O access performance (IOPS) can be displayed next to the respective resources. Furthermore, a serial number may be affixed next to the respective resources in order from the lowest I/O access performance.

In other words, when the administrator is to figure out the factor of the I/O failure that occurred in the volume A using the correlation of resources, since the resources that have no substantial correlation with the volume A have been differentiated from the resources having substantial correlation (performance association) with the volume A in which the factor of performance deterioration is to be identified, it is possible to limit the number of resources to be subject to inspection as to whether it is the bottleneck that is causing the performance deterioration of the volume A, and shorten the time required for analyzing the failure factor.

Figure 13:
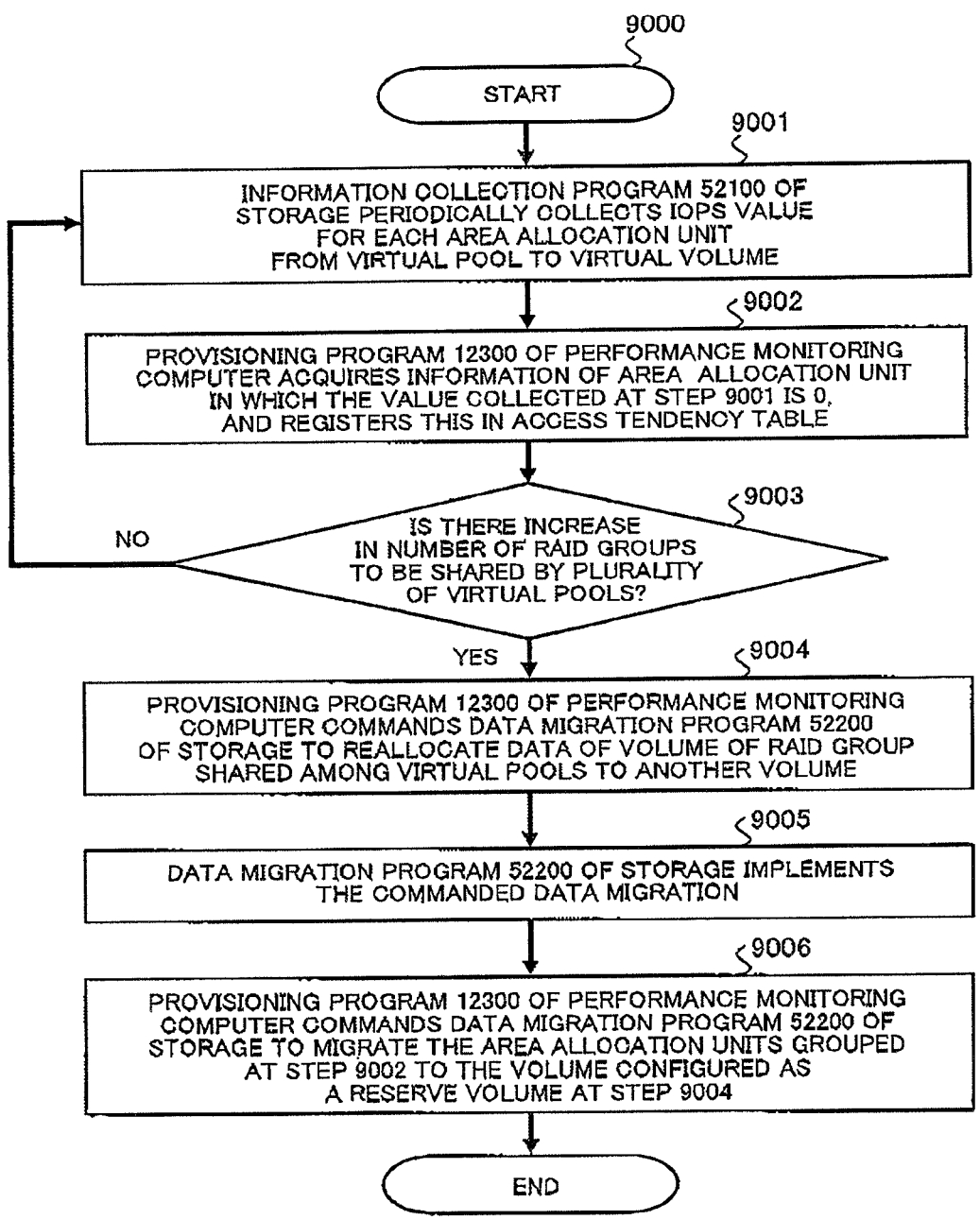
FIG. 13 is a flowchart showing an example of the data provisioning processing of the provisioning program according to the first embodiment.

The data provisioning processing to be implemented by the provisioning program 12300 of the performance monitoring computer 10000 is now explained with reference to FIG. 13. This processing is executed by the processor 11000 of the performance monitoring computer 10000 reading the program 12300 stored in the memory 12000, and relates to the data migration in the unit (=page) of allocating a storage area from the virtual pool to the virtual volume by using the access tendency, which is the I/O frequency (I/O per time) from the processor to the logical volume mapped to the virtual pool.

In the ensuing explanation, unless otherwise specified herein, each step is performed by the processor 11000 of the performance monitoring computer. FIG. 13 shows a flowchart 9000 depicting the outline of the data provisioning processing to be executed by the processor 11000 that read the provisioning program 12300.

Foremost, the information collection program 52100 of the storage subsystem receives a command from the performance monitoring computer and periodically collects the IOPS value for each area allocation unit (page) from the virtual pool to the virtual volume (step 9001). The collected values are notified from the storage subsystem to the performance monitoring computer.

Subsequently, the processor 11000 reads the provisioning program 12300 of the performance monitoring computer, acquires information of the area allocation unit in which the values collected at step 9001 are 0, and registers this in the access tendency table 12610 (step 9002). FIG. 14 described later shows the access tendency table 12610 with "0" registered therein.

The processor 11000 thereafter refers to the pool registration status table 12420, and checks whether there was an increase in the number of RAID groups shared by a plurality of virtual pools for each combination of virtual pools (step 9003).

If the management host computer 10000 does not increase the number of RAID groups to be actively shared and the number of shared RAID groups is not increased, since this means that the pages having the same access tendency have already been gathered in the logical volume, it is not necessary to perform the "reallocation processing" described later.

If there is an increase at step 9003, the provisioning program 12300 of the performance monitoring computer commands the data migration program 52200 of the storage to reallocate the data in pages units of the volume of the RAID groups shared among the virtual pools to a volume of another RAID group that is not being shared (step 9004).

Subsequently, the data migration program 52200 of the storage implements the commanded data migration (step 9005). Finally, the provisioning program 12300 of the performance monitoring computer commands the data migration program 52200 of the storage to migrate the pages grouped at step 9002 to a volume configured as a reserve volume at step 9004 (step 9006).

Figure 15:
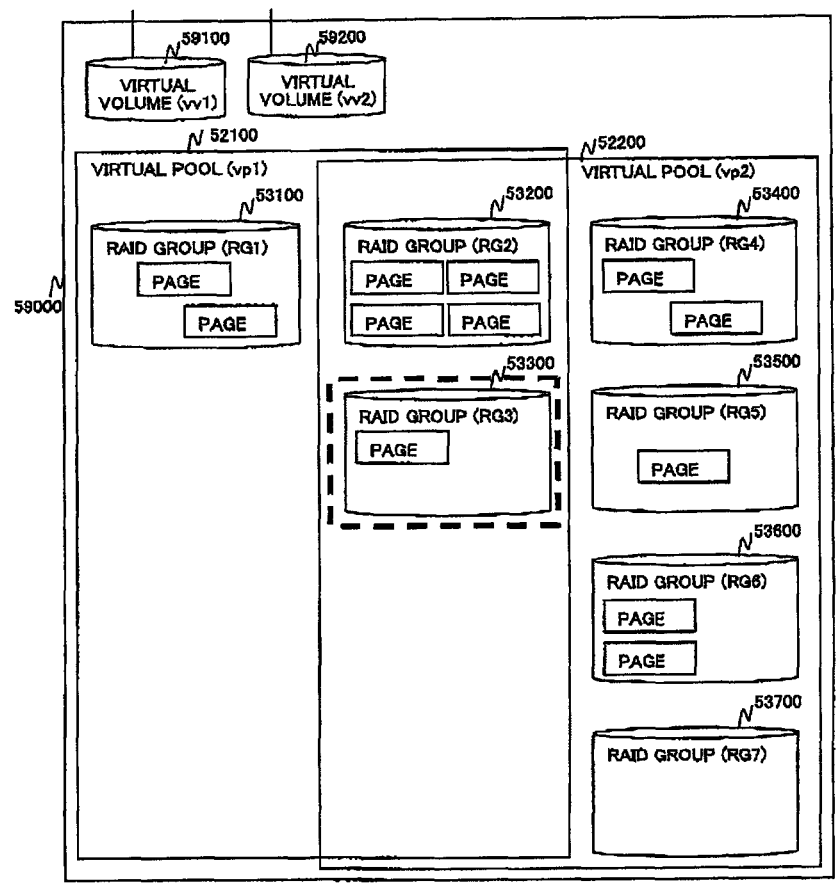
FIG. 15 is a diagram showing a status where the RAID group RG3 that was used by a single virtual pool is being newly shared among pools according to the first embodiment.
Figure 16:
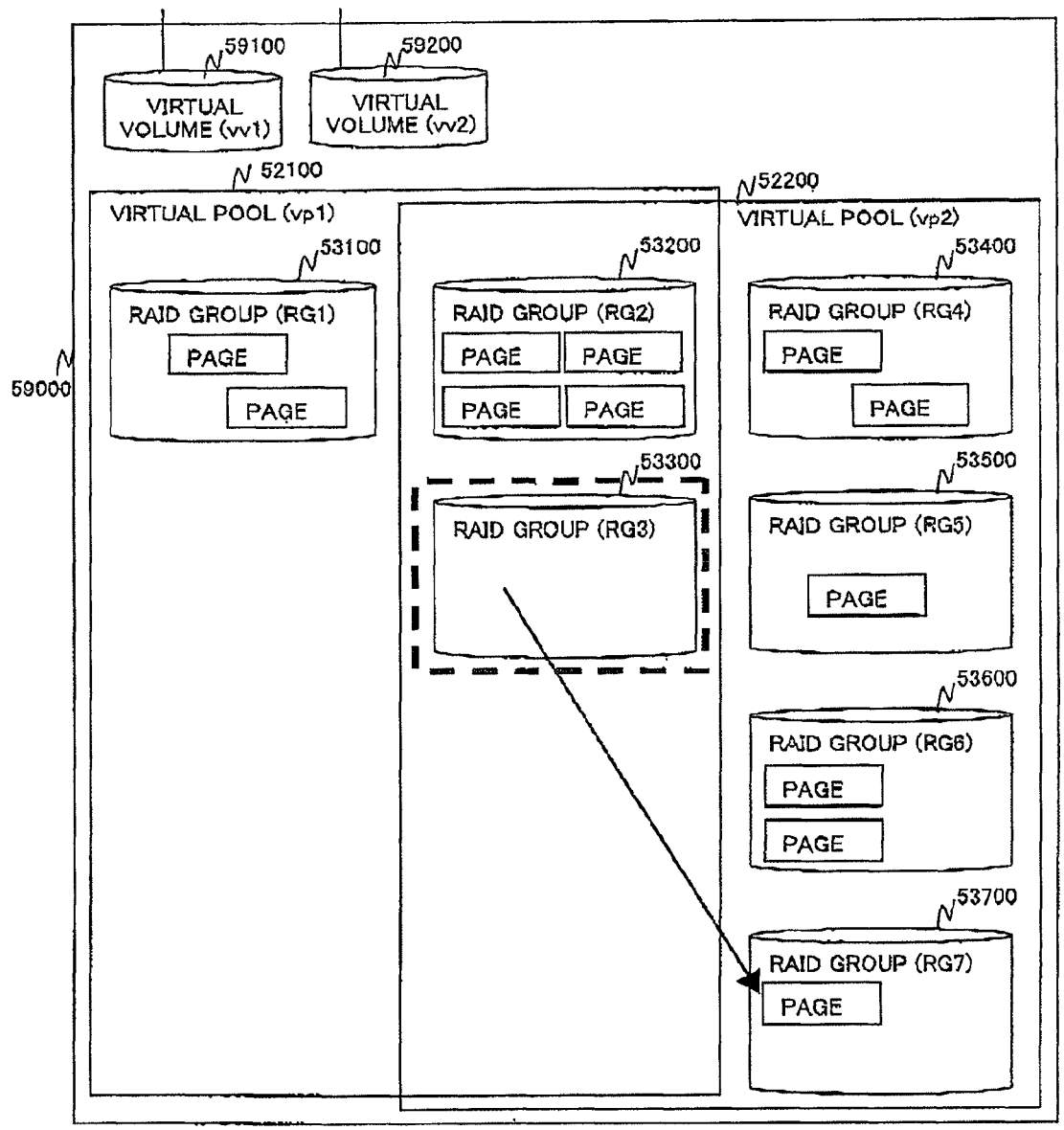
FIG. 16 is a diagram showing a status where the data written randomly in a page is migrated to a non-shared volume upon being shared in a plurality of virtual pools according to the first embodiment.
Figure 17:
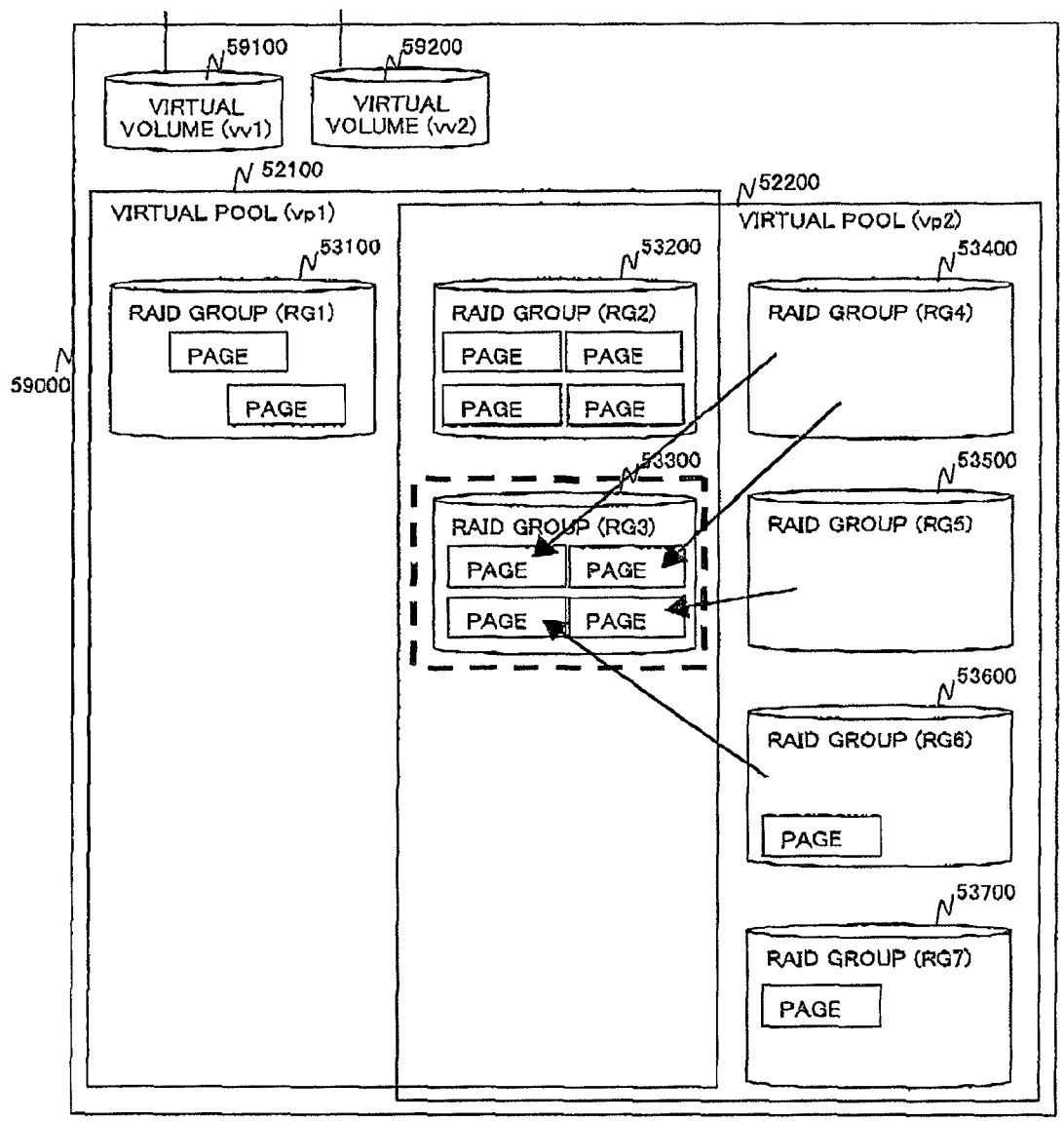
FIG. 17 is a diagram showing a status where data in a page showing the same access tendency contained in a RAID group that is not being shared among the virtual pools is migrated to a RAID group that is shared among a plurality of virtual pools.

The process from step 9003 to step 9006 is shown in the block diagrams of FIG. 15, FIG. 16, and FIG. 17. FIG. 15 shows a status where the RAID group RG3 that was only being used by the virtual pool vp2 theretofore is now newly shared by the virtual pool volume vp1. Specifically, this is a status where the volume configured from the RAID group RG3 is registered in or mapped to the virtual pool vp1 (Yes at step 9003).

The volume configured from the RAID group RG3 was configured from pages having a different access tendency than the RAID group RG2. When the RAID group RG3 is to be shared among a plurality of virtual pools, data in the pages that were randomly written into the volume configured from the RAID group RG3 is migrated to a non-shared volume (step 9004, step 9005).

In other words, as shown in FIG. 16, data of the RAID group RG3 is migrated to a volume configured from the RAID group RG7 that is not being shared by the virtual pools.

In addition, the pages showing the same access tendency (in this embodiment, IOPS is "0") and grouped at step 9002 are migrated to a volume that was configured as a reserve volume at step 9004; that is, migrated to the RAID group RG3. Specifically, as shown in FIG. 17, data in the pages showing the same access tendency contained in the RAID group RG4, the RAID group RG5, and the RAID group RG6 that are not shared among the virtual pools is migrated to the RAID group RG3.

Since the performance information of each data area and the performance information of the volumes will change after the execution of the migration, it is necessary to recreate the configuration information table 12430. The configuration information table is recreated by the processor 11000 periodically, or upon receiving an operational status presentation request from the host system management software based on the input module 15000 of the terminal used by the SAN administrator, or when the execution of the migration is complete, and so on.

During the migration, as a result of migrating the pages to the extent that the total value of the past maximum IOPS to the respective pages arranged in the same pool volume (volume configured from the RAID group RG3) registered in the access tendency table 12610 (FIG. 14) does not exceed the threshold value of the IOPS of the pool volume (volume configured from the RAID group RG3) to arrange the area allocation unit, the load will be concentrated when pages having similar performance tendencies are gathered, and it will thereby be possible to prevent the deterioration in the I/O performance to the pool volume.

The administrator sets the threshold value upon taking into account the various hardware performances and anticipating the level of sustainable operation.

FIG. 14 shows an example of the access tendency table 12610 in the access tendency repository retained by the performance monitoring computer 10000. This table shows the grouping of the allocation unit areas in a volume (for instance, IOPS is 0) having the same tendency as the I/O performance value for each given period of time.

The access tendency table is a table in which the recorded values are changed by the provisioning program 12300. In the access tendency table 12610, the unit time range for checking the access tendency is registered in the access period column 12611, a value for uniquely identifying the storage subsystem is registered in the storage name column 12612, a value for uniquely identifying the logical volume to be mapped to the virtual pool is registered in the logical volume number column 12613, the capacity of the storage area allocated dynamically from the storage area in the RAID group set in association with the virtual pool is registered in the data area column 12614, and the I/O Per Second value showing the maximum value among the IOPS history to the corresponding data area is registered in the maximum I/O Per Second column 12615.

If there is an increase at step 9003, a case was explained where the provisioning program 12300 of the performance monitoring computer commands the data migration program 52200 of the storage to reallocate the data in pages units of the volume of the RAID groups shared among the virtual pools to a volume of another RAID group that is not being shared. Nevertheless, in order to prolong the period that the allocation area in the volume contained in the RAID group to be shared among a plurality of virtual pools will show a similar access tendency, a command may also be issued to the data migration program 52200 of the storage at each given time (steps 9004 to 9006 are executed at each given time). Based on the data migration performed at each given time, the period that the pages having the same access tendency being consolidated in the same RAID group can be prolonged.

In the foregoing embodiment, by identifying the performance association according to the I/O performance information of the volume set in the virtual pool and displaying the information, performance monitoring that inhibits erroneous decisions caused by unnecessary performance information is realized, and it is possible to pursue the performance deterioration factor in the virtual environment upon improving the accuracy in the analysis of the performance bottleneck factor.

Figure 18:
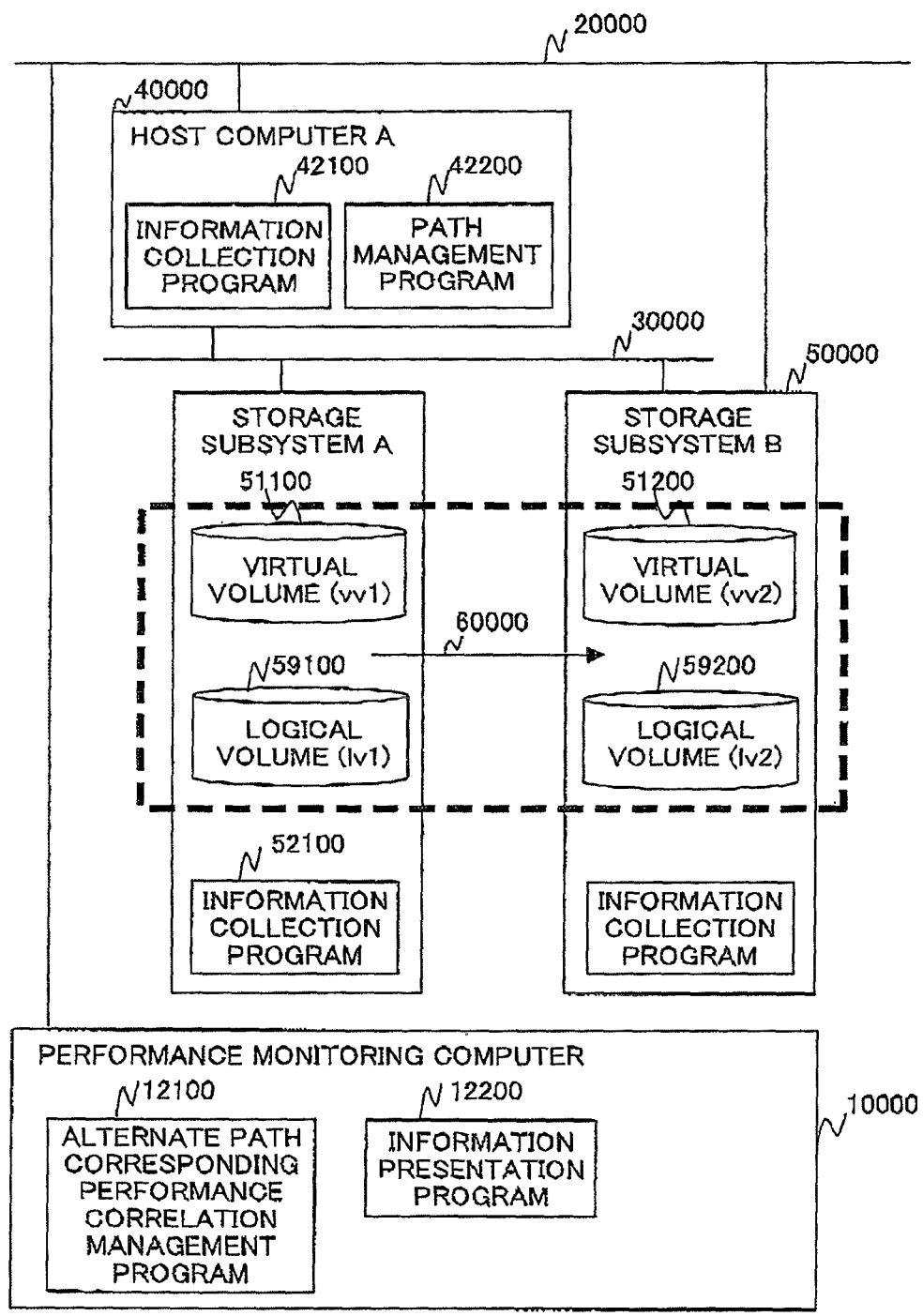
FIG. 18 is a diagram showing a configuration example of a computer system according to the second embodiment.

The second embodiment is now explained. FIG. 18 shows a block configuration diagram of a modified example of the computer system according to the first embodiment. This computer system includes one or more host computers 40000 having an information collection program, two or more storage subsystems 50000 having an information collection program and loaded with a replication function, and one or more management host computers 10000 having an alternate path corresponding performance correlation management program and an information presentation program.

Here, the storage subsystem is loaded with a virtualization function and a replication function and defines the virtual volume to become the target of access from the host computer, and provides the logical volume as the substance thereof from the memory device in the storage subsystem or the memory device outside the storage subsystem to the virtual volume.

In the ensuing explanation, for the sake of convenience, the second embodiment is described taking an example where one host computer (host computer A) 40000 and two storage subsystems 50000 respectively loaded with the virtualization function and the replication function are mutually connected via the fibre channel 30000.

The virtual volume vv1 of the storage subsystem A and the virtual volume vv2 of the storage subsystem B are mapped to the host computer A.

The I/O from the host computer A to the virtual volume vv1 is sent to the virtual volume vv1 via the fibre channel 30000, and this I/O is sent to the logical volume that is configured from a physical storage area in the storage subsystem and which corresponds to the virtual volume vv1.

The physical storage area mapped to the virtual volume vv1 may also exist in another storage subsystem outside the storage subsystem retaining the virtual volume.

Based on the replication function loaded in the storage subsystem A, the virtual volume vv1 of the storage subsystem A and the virtual volume vv2 of the storage subsystem B are defined as a replication pair 60000, and this definition is set in the storage subsystem A and the storage subsystem.

The replication pair status may be either a synchronous replication or an asynchronous replication. As the topology of the host computer A, the storage subsystem A, and the storage subsystem B, in addition to directly connecting these components with a fibre channel 30000 as shown in FIG. 18, they may also be connected via networking equipment such as one or more fibre channel switches.

As with the first embodiment described above, although the fibre channel 30000 is used to connect the host computer A and the storage subsystem A, this may be a different network so long as it is a data communication network and, for instance, may be an IP network.

Figure 19:
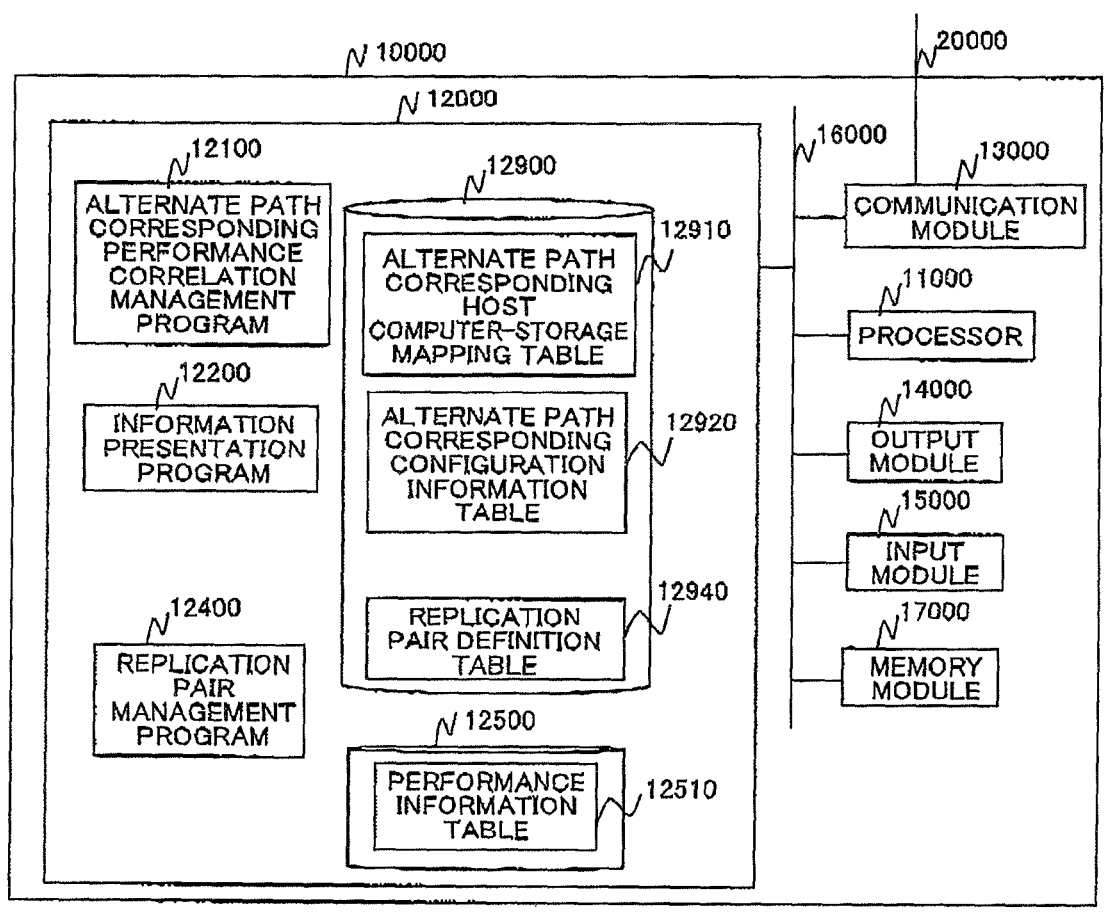
FIG. 19 is a diagram showing a configuration example of a performance monitoring computer according to the second embodiment.

FIG. 19 shows a block diagram pertaining to a configuration example of the performance monitoring computer 10000. The memory 12000 stores an alternate path corresponding performance correlation management program 12100, an information presentation program 12200, and a replication pair management program 12400, which are programs to be executed by the performance monitoring computer. Although the details regarding these programs will be described later, the constituent features other than these programs are the same as FIG. 2, and the detailed explanation thereof is omitted.

Figure 20:
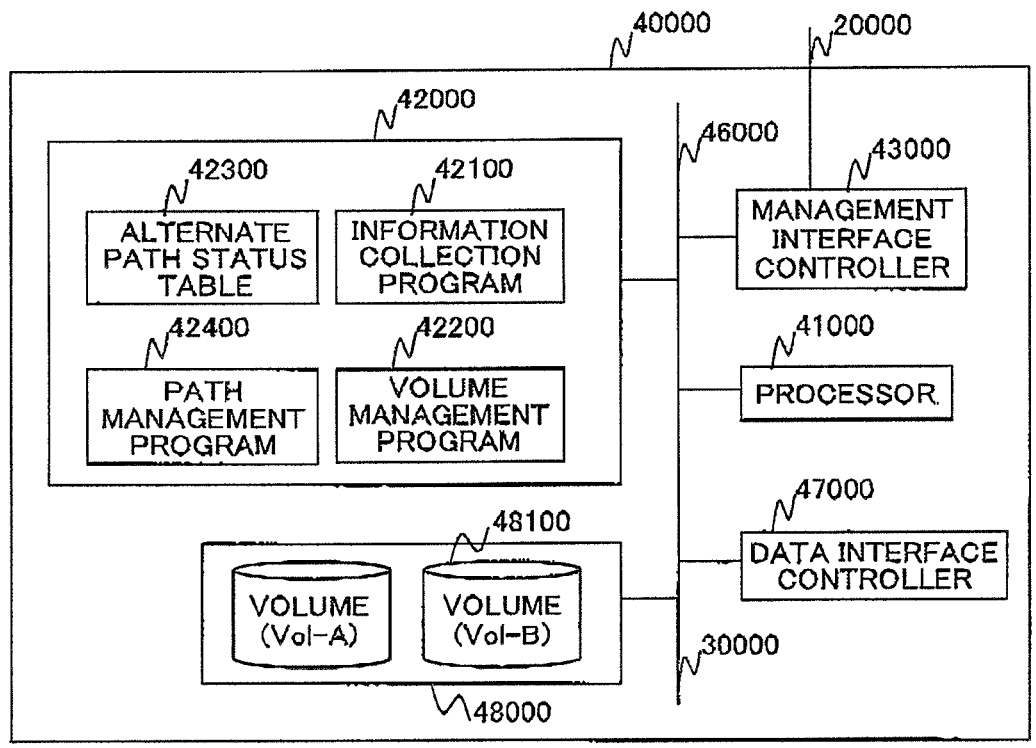
FIG. 20 is a diagram showing a configuration example of a host computer according to the second embodiment.

FIG. 20 shows a configuration example of the host computer 40000. The host computer 40000 of FIG. 20 differs from the one depicted in FIG. 3 in that the memory 42000 of the former additionally stores a path management program 42300, and an alternate path status table [42300] retaining information regarding which path among the alternate paths is of an active status.

The volume management program 42200 mounts the logical volume provided from the storage subsystem A on the volume 48100 in the memory module 48000 of the host computer A, and enables the business program in the host computer A to use the logical volume provided to the SAN from the storage subsystem A. As with the first embodiment described above, although a case was explained where there is one host computer A, and the data interface controller of the host computer A is one unit, a plurality of host computers and a plurality of data interface controllers may be provided.

The path management program performs processing for detecting a failure when the network between the host computer A and the virtual storage subsystem A becomes unavailable due to a failure or when the virtual storage subsystem A shuts down due to a failure, and switches the destination of the I/O from the storage A to the storage B without the business program in the host computer A being aware of such switch.

Figure 21:
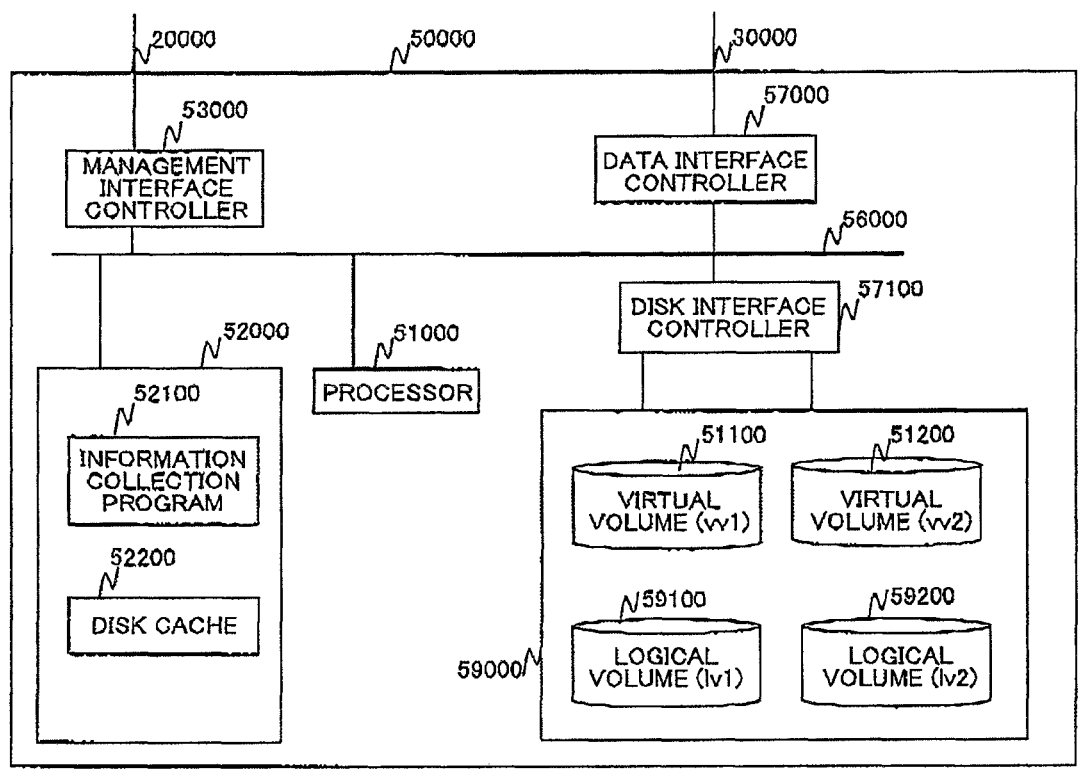
FIG. 21 is a diagram showing a configuration of a storage according to the second embodiment.

FIG. 21 shows a configuration example of the storage subsystem 50000. The storage subsystem 50000 includes the same constituent features as FIG. 4 of the first embodiment. Moreover, in substitute for the configuration of the storage subsystem shown in FIG. 4, a disk cache 52200 is provided to the memory 52000 of the storage subsystem 50000, and a logical volume is provided to the volume provision unit 59000 of the storage subsystem 50000. Although the disk cache was configured in the memory, this may also be configured in a location that is separate from the memory 52000. Similar to the first embodiment, the logical volume is configured from a part of the storage area of the RAID group.

FIG. 22 shows an example of the alternate path corresponding host computer-storage mapping table 12910 to be stored in the configuration information repository 12900 retained by the performance monitoring computer 10000. This table shows to which logical volume and to which RAID group the respective volumes of the respective host computers 40000 correspond via which interface of the storage subsystem.

This table stores information of inactive alternate paths in addition to active paths regarding entries that have the same host computer name and the same volume number. The alternate path corresponding host computer-storage mapping table 12910 is a table to which records are added by the alternate path corresponding performance correlation management program 12100.

Since the individual information to be stored is the same as the information of the first embodiment, the explanation thereof is omitted. Information showing the virtual volume corresponding to the logical volume may also be added as an item of the table.

FIG. 23 shows an example of the replication pair definition table 12940 to be stored in the configuration information repository 12900 retained by the performance monitoring computer 10000. This table stores the correspondence relationship concerning the main/sub of the replication source logical volume and the replication destination logical volume of the respective replication pair definitions.

The replication pair definition table 12940 is a table to which records are added by the alternate path corresponding performance correlation management program 12100.

In the replication pair definition table 12940, a value for uniquely identifying the storage subsystem is registered in the storage name column 12941, a value for uniquely identifying the logical volume of the storage subsystem shown in the storage name column 12941 is registered in the logical volume number column 12942, a value showing whether the volume is a replication source volume or a replication destination volume of the replication pair is registered in the main/sub column 12943, a value for uniquely identifying the storage subsystem of the replication destination is registered in the replication opponent storage name column 12944, and a value for uniquely identifying the logical volume of the replication destination is registered in the replication destination logical volume number column 12945.

FIG. 24 shows an example of the performance information table 12510 depicting the performance information of the SAN system pertaining to FIG. 18 to be stored in the performance information repository 12500 retained by the performance monitoring computer 10000. This table stores the performance information of the respective volumes in the respective host computers 40000, the logical volumes of the respective storage subsystems 50000, the RAID groups of the respective storage subsystems, and so on. Since the individual information to be stored in the performance information table 12510 is the same as the information of the first embodiment, the explanation thereof is omitted.

FIG. 25 shows an example of the configuration information table 12920 having the replication pair definition and the configuration information of the SAN system having a performance association to be stored in the configuration information repository 12900 retained by the performance monitoring computer 10000.

In the configuration information table 12920, a value for uniquely identifying the host computer 40000 is registered in the host computer name column 12921, a value for uniquely identifying the volume 48000 in the host computer is registered in the volume number column 12922, a value for uniquely identifying the storage subsystem 50000 is registered in the storage name column 12923, a value for uniquely identifying the data interface being used by the volume of the volume number column is registered in the data interface number column 12924, a value for uniquely identifying the logical volume of the storage subsystem shown in the storage name column 12923 is registered in the logical volume number column 12925, a value for uniquely identifying the RAID group configuring the logical volume identified with the logical volume number is registered in the RAID group column 12926, a value for uniquely identifying the storage subsystem of the replication destination is registered in the replication opponent storage name column 12927, a value for uniquely identifying the logical volume of the replication destination is registered in the replication destination logical volume number column 12928, a value showing whether the volume is a replication source volume or a replication destination volume of the replication pair is registered in the main/sub column 12929, and a flag showing whether to present the performance of the replication pair destination volume, which was set according to the performance value of the replication destination volume of the replication pair, as having correlation is registered in the performance correlation flag column 12930.

Figure 26:
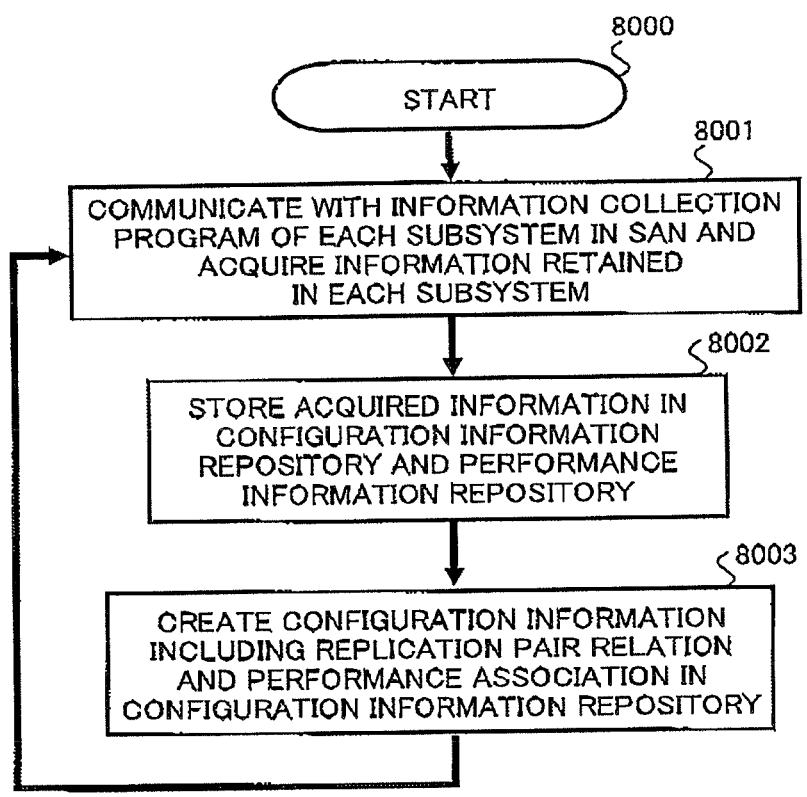
FIG. 26 is a flowchart showing an example of the association table creation processing of the performance correlation management program according to the second embodiment.

FIG. 26 shows a flowchart 8000 depicting the performance correlation management processing to be executed by the alternate path corresponding performance correlation management program 12100. This processing is periodically executed by the processor 11000 of the performance monitoring computer 10000 executing the program stored in the memory 12000, and creates a relation table for identifying the latest correlation regarding the performance association among a plurality of resources based on information pertaining to the I/O performance of the resources under the SAN environment.

The processing of step 8001 and step 8002 is the same as the processing of the first embodiment described above, and the explanation thereof is omitted. Nevertheless, as the information collected and retained by the information collection program of the host computer under the SAN environment at step 8001, the alternate path information to the volume of the host computer shown in the alternate path corresponding host computer-storage mapping table 12910 is included.

Figure 27:
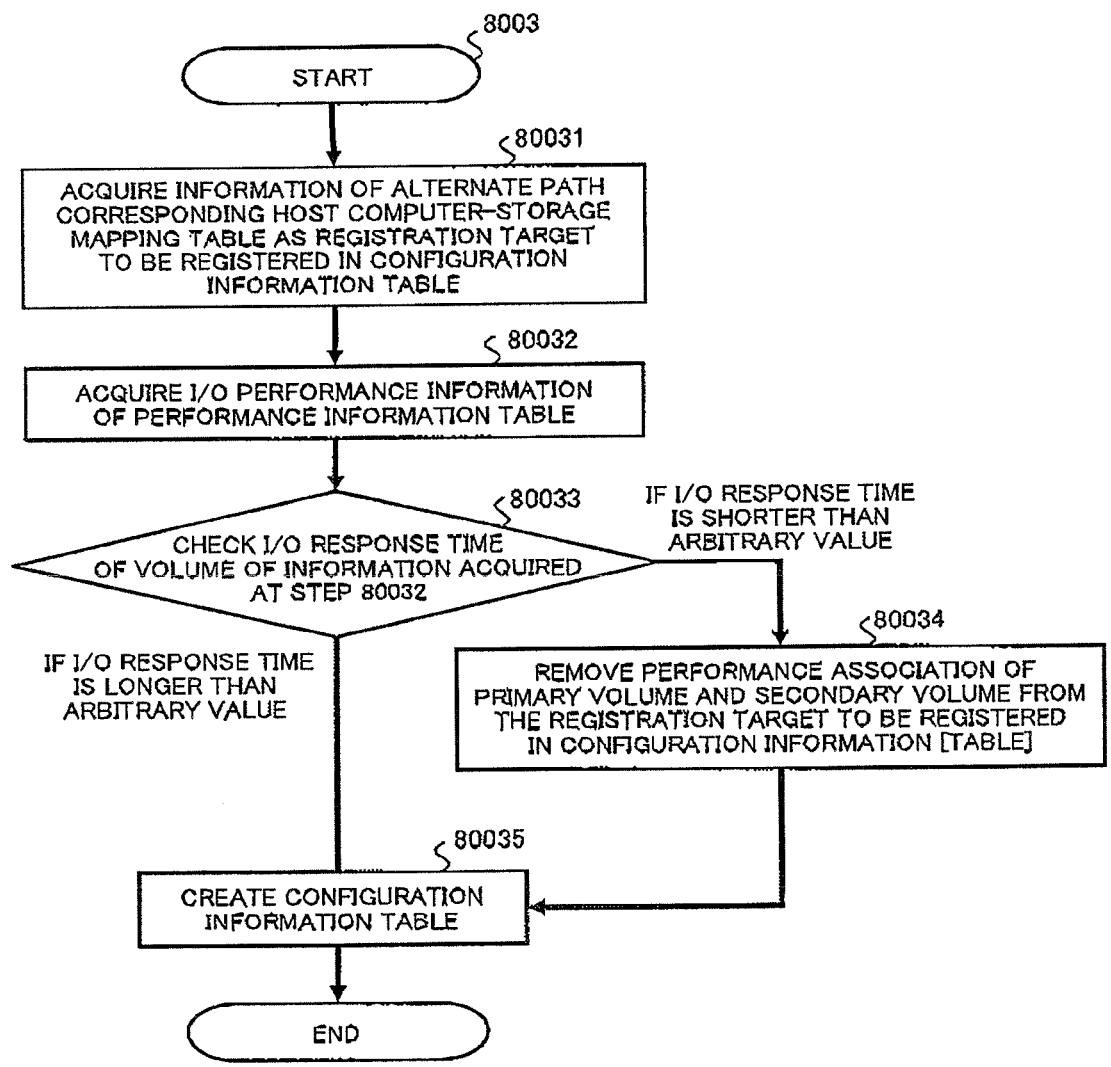
FIG. 27 is a flowchart showing an example of the performance correlation management processing and the performance correlation presentation processing of the performance correlation management program according to the second embodiment.

FIG. 27 shows a flowchart of step 8003 for creating the configuration information including the replication pair relation and the performance association in the configuration information repository. The processor 11000 refers to information of the alternate path corresponding host computer-storage mapping table 12910 and information of the replication pair definition table, and acquires the respective entries as the registration target to be registered in the configuration information table 12920 (step 80031).

The processor 11000 refers to the I/O performance information (in this example, the I/O Response Time) of these volumes in the performance information table in order to determine whether there is performance association between the replication source logical volume and the replication destination logical volume (step 80032).

[The processor 11000] checks the value of the volumes set as the replication destination volume of the alternate path among the respective volumes acquired at step 80031 (step 80033), and, if the I/O Response Time is shorter than an arbitrary value, excludes the performance association of the replication source volume and the replication destination volume from the registration target to be registered in the configuration information (step 80034).

Although the configuration information table is created periodically in this embodiment, the processor 11000 may also create the configuration information containing the performance association of resources (for instance, logical volumes), in which the presentation of the operational status was requested, in the configuration information repository at the timing of receiving an operational status presentation request from the host system management software based on the input module 15000 of the terminal used by the SAN administrator.

In this embodiment, although the decision criterion on whether a volume is to become a registration target to be registered in the configuration information table was an arbitrary value of the I/O Response Time, the value of the I/O Response may be a value that was set by the administrator or a fixed value according to the environment. For instance, a threshold value to be set for notifying an alert of the performance monitoring may be set as the decision criterion on whether the replication destination volume is to become the registration target to be registered in the configuration information table.

Moreover, a performance index other than the I/O Response Time such as the I/O Per Second or the I/O Transfer Rate may also be used.

When the information display module receives an operational status presentation request from the host system management software via the input module 15000 of the terminal used by the administrator, it presents the various information based on the information of the configuration information table created at step 8003 (step 7000).

Figure 28:
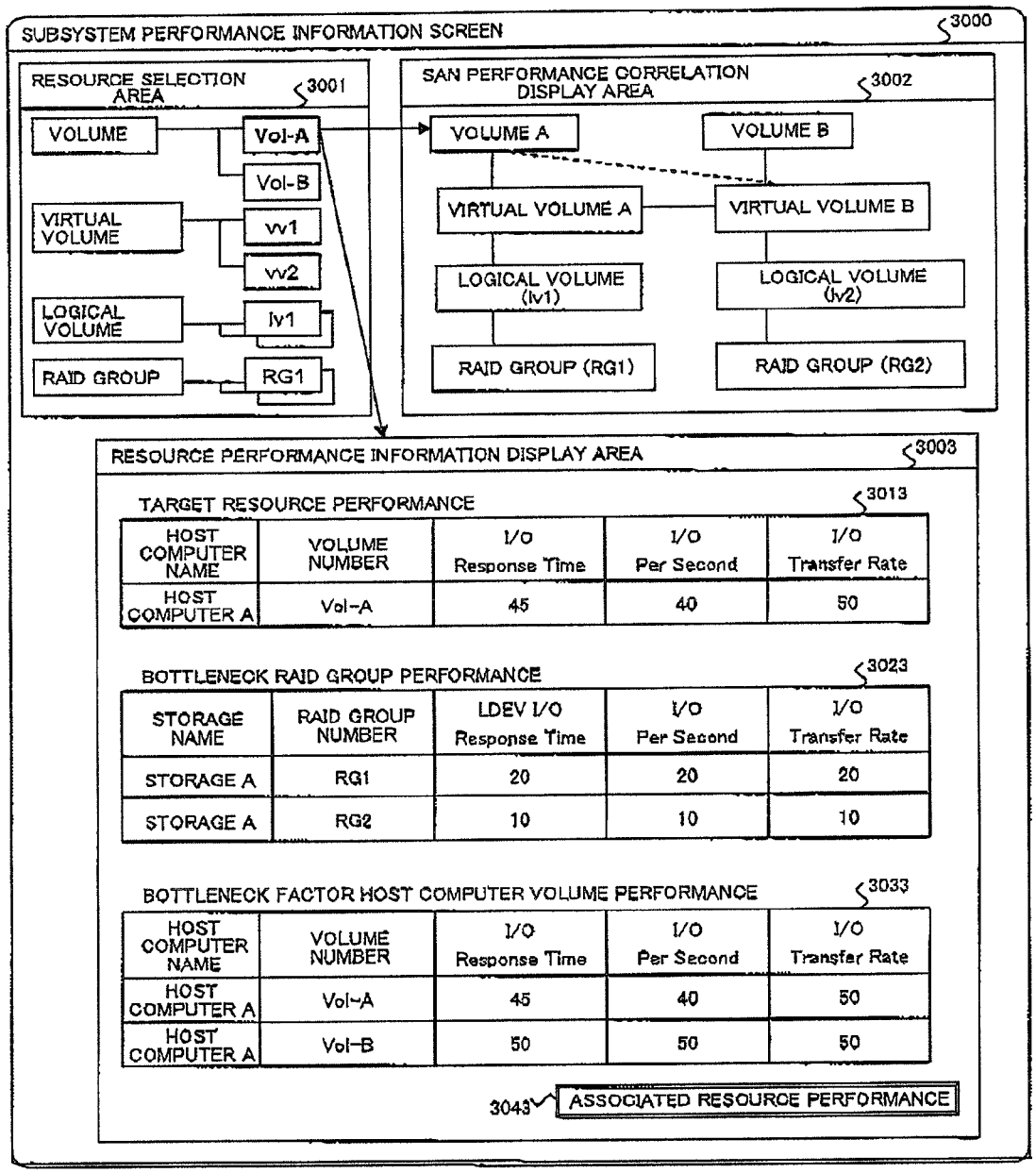
FIG. 28 is a diagram showing an example of a subsystem performance information screen to be presented to the administrator in the second embodiment.
Figure 29:
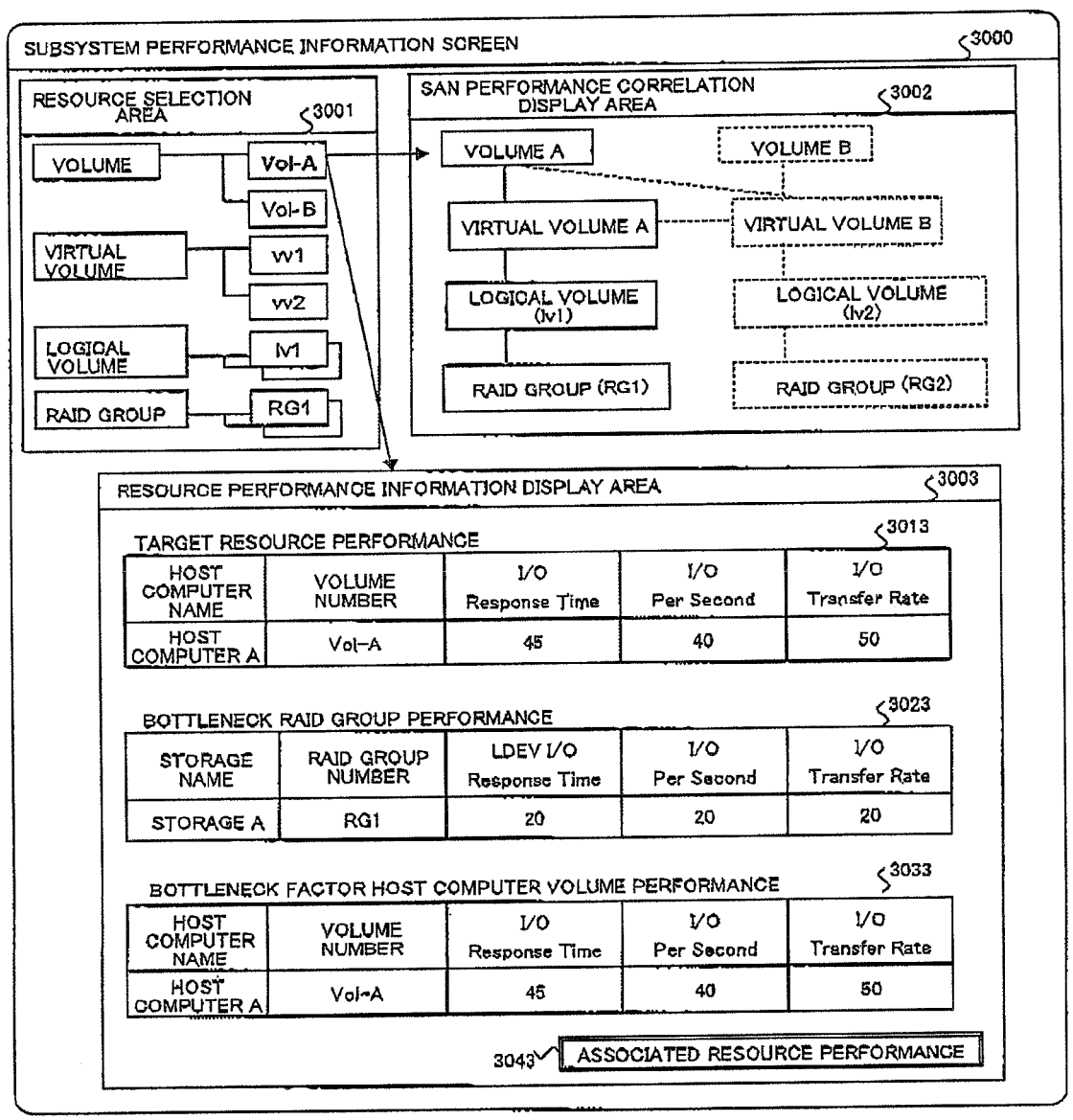
FIG. 29 is a diagram showing an example of a subsystem performance information screen to be presented to the administrator in the second embodiment.

FIG. 28 and FIG. 29 are examples of the subsystem performance information screen 3000 to be output by the processor 11000 at step 7000. The screen 3000 of FIG. 28 and FIG. 29 includes a resource selection area 3001, a SAN performance correlation display area 3002, and a resource performance information display area 3003.

In FIG. 28 and FIG. 29, the SAN performance correlation presentation screen 3002 displays information related to the resource selected in the resource selection area 3001.

FIG. 28 displays the volume A in the host computer, the virtual volume A as the mount destination of the volume A, the RAID group RG1 as a physical storage area of the logical volumes Iv1, Iv1, as well as the volume B in the host computer, the virtual volume B as the mount destination of the volume B, and the RAID group RG2 as a physical storage area of the logical volumes Iv2, Iv2.

FIG. 29 displays the volume A in the host computer, the virtual volume A as the mount destination of the volume A, the RAID group RG1 as a physical storage area of the logical volumes Iv1, Iv1, and the other resources are displayed with a dotted line.

In FIG. 28 and FIG. 29, the display of the virtual volume B and the logical volume Iv2 in a replication pair relationship with the virtual volume A and the logical volume Iv1 is switched based on the value of the I/O Response Time of the logical volume Iv2 according to step 80033 shown in FIG. 27.

In this modified example, although the logical volumes of the replication destination and their related resources were displayed with a dotted line when a replication pair relation is established and the I/O Response Time is less than an arbitrary value, other presentation methods such as not displaying these resources may also be adopted, so as long as it is possible to show that there is no performance correlation.

The update of the display is implemented according to the performance correlation presentation processing 7000 of the alternate path corresponding performance correlation management program 12100. In FIG. 28, the resource performance information display area 3003 is the same as in the first embodiment, and the explanation thereof is omitted. Although the information collection program is retained in the host computer and the storage subsystem in this modified example, it may also be executed in the performance monitoring computer or another host computer for the information collection program. In this modified example, the performance correlation can be identified dynamically according to the alternate status of the I/O path from the host computer to the storage subsystem and the performance information of the volumes.

According to the present invention disclosed herein, performance monitoring that inhibits erroneous decisions caused by unnecessary performance information is realized, and it is possible to pursue the performance deterioration factor in the virtual environment upon improving the accuracy in the analysis of the performance bottleneck factor, and alleviate the burden of the administrator in charge of managing the performance of the computer system.

What we claim is:

1. A storage system, comprising:
a host computer;
a memory device;
a plurality of resources for allocating a storage area of the memory device in response to an access request from the host computer;
a storage subsystem having a memory for storing a correspondence relationship between the plurality of resources based on information concerning performance of the plurality of resources and configuration information including a performance correlation among the plurality of resources; and
a processor for outputting a subsystem performance information screen which includes a performance correlation display area for displaying a correlation of a plurality of the resources based on mapping or correspondence relationships of said plurality of resources,
wherein the processor is configured to determine whether or not a correspondence relationship exists between selected ones of the resources by using I/O frequency performance information of the respective resources,
wherein, if the processor determines that a correspondence relationship does exist between the selected resources, based on the I/O frequency performance information, the processor is configured to associate the selected resources with one another and output them, and,
wherein, if the processor determines that there is no correspondence relationship between the selected resources, the processor is configured to output the resources without associating them with each other.

2. The storage system according to claim 1, wherein the performance correlation display area is a SAN performance correlation display area for displaying the correlation of the plurality of resources based on the mapping or correspondence relationship of such plurality of resources under a SAN environment.

3. The storage system according to claim 1, wherein the subsystem performance information screen further includes a resource performance information display area for displaying information pertaining to the performance of the plurality of resources.

4. The storage system according to claim 2, wherein the subsystem performance information screen further includes a resource performance information display area for displaying information pertaining to the performance of the plurality of resources.

* * * * *